(12) United States Patent
Bella et al.

(10) Patent No.: US 7,406,117 B2
(45) Date of Patent: Jul. 29, 2008

(54) XDSL MULTI-HYBRID MODEM WITH POWER SPECTRAL DENSITY SHAPING

(75) Inventors: Greg Bella, Naperville, IL (US); Henry Gilsdorf, Earlville, IL (US); George Pitsoulakis, Orland Park, IL (US)

(73) Assignee: Westell Technologies, Inc., Aurora, IL (US)

( * ) Notice: Subject to any disclaimer, the term of this patent is extended or adjusted under 35 U.S.C. 154(b) by 240 days.

(21) Appl. No.: 10/103,478

(22) Filed: Mar. 21, 2002

(65) Prior Publication Data

US 2003/0202570 A1     Oct. 30, 2003

(51) Int. Cl.
H04B 1/38      (2006.01)
H04L 5/16      (2006.01)
H04B 3/00      (2006.01)

(52) U.S. Cl. ......................... 375/219; 375/296
(58) Field of Classification Search ................. 375/219, 375/296, 285, 257, 287, 288
See application file for complete search history.

(56) References Cited

U.S. PATENT DOCUMENTS

| | | | | |
|---|---|---|---|---|
| 5,377,230 A | * | 12/1994 | Golden | 375/296 |
| 5,521,949 A | * | 5/1996 | Huang et al. | 375/377 |
| 5,757,803 A | * | 5/1998 | Russell et al. | 370/494 |
| 5,781,728 A | * | 7/1998 | Rybicki et al. | 709/230 |
| 5,825,826 A | * | 10/1998 | May et al. | 375/295 |
| 5,852,630 A | | 12/1998 | Langberg et al. | 375/219 |
| 6,028,486 A | * | 2/2000 | Andre | 330/297 |
| 6,067,316 A | * | 5/2000 | Amrany et al. | 375/220 |
| 6,115,466 A | | 9/2000 | Bella | 379/399 |
| 6,181,775 B1 | | 1/2001 | Bella | 379/29 |
| 6,205,522 B1 | | 3/2001 | Hudson et al. | 711/147 |
| 6,212,229 B1 | * | 4/2001 | Salinger | 375/224 |
| 6,212,259 B1 | | 4/2001 | Kiko | 379/34 |
| 6,246,716 B1 | * | 6/2001 | Schneider | 375/220 |
| 6,252,900 B1 | | 6/2001 | Liu et al. | 375/219 |
| 6,278,769 B1 | | 8/2001 | Bella | 379/29.11 |
| 6,281,829 B1 | * | 8/2001 | Amrany et al. | 341/155 |
| 6,298,046 B1 | | 10/2001 | Thiele | 370/282 |
| 6,333,920 B1 | * | 12/2001 | Nguyen et al. | 370/281 |
| 6,339,613 B2 | * | 1/2002 | Terry | 375/227 |
| 6,411,657 B1 | * | 6/2002 | Verbin et al. | 375/285 |
| 6,546,090 B1 | * | 4/2003 | Bremer et al. | 379/93.08 |
| 6,549,520 B1 | * | 4/2003 | Gross et al. | 370/242 |
| 6,583,662 B1 | * | 6/2003 | Lim | 327/553 |
| 6,738,418 B1 | * | 5/2004 | Stiscia et al. | 375/222 |

(Continued)

OTHER PUBLICATIONS

Sanjeev Mervana "Design and Implementation of DSL-Based Access Solutions", Sep. 14, 2001, Cisco Press, Chap.2.*
Saarela, Kimmo K., "ADSL," Tampere University of Technology, Telecommunications Laboratory, 1995.
International Search Report for PCT/US03/07449 Mailed Nov. 28, 2003.

*Primary Examiner*—Jean B Corrielus
(74) *Attorney, Agent, or Firm*—McDonnell Boehnen Hulbert & Berghoff

(57) ABSTRACT

Power spectral density shaping can be used in an XDSL system in order to adjust power spectral density properties of signals transmitted by an XDSL modem. The XDSL modem may include a power spectral density shaping filter, which can be adjusted to change the power spectral density properties of outputted signals. A processor may also perform power spectral density shaping of signals transmitted by the XDSL modem. The power spectral density shaping may be used to increase a downstream transmission rate.

14 Claims, 17 Drawing Sheets

U.S. PATENT DOCUMENTS

| | | | |
|---|---|---|---|
| 6,760,383 B1 * | 7/2004 | Darveau | 375/259 |
| 6,870,928 B1 * | 3/2005 | Conroy et al. | 379/399.01 |
| 6,879,639 B1 * | 4/2005 | Verbin et al. | 375/285 |
| 7,006,610 B2 * | 2/2006 | Schoessow | 379/93.05 |
| 2001/0006509 A1 * | 7/2001 | Nguyen et al. | 370/281 |
| 2001/0048716 A1 * | 12/2001 | Gough et al. | 375/222 |
| 2002/0032004 A1 | 3/2002 | Widrow | 455/22 |
| 2003/0012364 A1 * | 1/2003 | Lee | 379/402 |
| 2003/0099286 A1 * | 5/2003 | Graziano et al. | 375/222 |
| 2004/0017900 A1 * | 1/2004 | Starr | 379/93.08 |
| 2004/0179662 A1 * | 9/2004 | Bremer et al. | 379/93.01 |
| 2005/0276342 A1 * | 12/2005 | Zhou | 375/260 |

* cited by examiner

XDSL MULTI-HYBRID MODEM WITH POWER SPECTRAL DENSITY SHAPING

FIELD OF THE INVENTION

This invention relates generally to XDSL transmission systems. More specifically, it relates to a system and method for adjusting data transmission rates in an XDSL transmission system.

BACKGROUND OF THE INVENTION

Traditional twisted-pair telephone lines can be used to provide voice telephone service to customers. A central office can connect to a customer premises via a transmission line, such as a twisted-pair copper line. Once at the customer premises, the transmission line may connect to wiring within the customer premises. The customer wiring may split into more than one branch, and the branches may run to various different locations within the customer premises. Plain old telephone service ("POTS") devices, such as analog telephones, can connect to the customer wiring branches. Through the customer wiring, the POTS devices can interface with the central office and ultimately communicate with other devices also connected to the network.

In addition to carrying voice calls, the transmission line can also carry data. For example, computers, fax machines or other data devices can connect to the customer wiring. Then they can communicate with the central office, and ultimately with other devices connected to the network. In this type of configuration, the data is transmitted over the bandwidth generally allocated for voice calls. The bandwidth for voice calls is generally limited, and this also limits the data transmission rate. Additionally, a standard telephone line generally cannot support simultaneous data and voice transmissions.

XDSL is a technology that overcomes some of the limitations of POTS service. The acronym XDSL generally identifies the broad class of "digital subscriber line" services. The letter "X" in the general acronym can be replaced with another letter to identify a specific type of digital subscriber line service, such as asymmetric digital subscriber line ("ADSL") service or high-bit-rate digital subscriber line ("HDSL").

Using XDSL, the bandwidth of the telephone line can be increased to allow faster data communication than POTS service. For example, by changing bandwidth-limiting filters on the network, the overall available bandwidth for the transmission line connected to the customer premises can be increased. A portion of the available bandwidth can be used to support POTS services, such as a voice call. Another portion of the bandwidth can be used to support high-speed data communications. By using separate bandwidths for POTS and XDSL data, the XDSL system can support simultaneous voice and data communications.

In the XDSL system, the available bandwidth can be divided into three ranges. A POTS frequency range can be used to support POTS services, and two frequency ranges can be used to support XDSL services. An upstream frequency range can be used for XDSL communication from the customer premises to the central office, and a downstream frequency range can be used for XDSL communication from the central office to the customer premises. In order to prevent one frequency range from adversely interfering with another frequency range, the frequency ranges can be separated by stopbands.

Various different problems can occur within the XDSL system that can adversely affect the overall data transmission rate. For example, a hybrid may be used to separate transmit and receive signals at a 4-wire to 2-wire interface, such as at the interface of the transmission line and the customer premises. The hybrid can send signals from the central office to an XDSL device on a receive path, and it can receive transmit signals from the XDSL device on a transmit path. The hybrid can include an impedance matched to the transmission line. If the impedance of the hybrid matches closely to the impedance of the transmission line, then the hybrid may be able to effectively cancel transmit signals from the receive path. However, if the impedance does not closely match that of the transmission line, then the hybrid may not effectively cancel transmit signals from the receive path, thereby decreasing the overall transmission rate in the receive path.

Bridge taps may adversely affect the performance within the transmission system. A bridge tap can be, for example, a non-terminated copper pair wire connected in parallel to a 2-wire line. Bridge taps can be located on the transmission line, on the wiring within the customer premises or on both locations. The bridge taps can alter the impedance of the transmission line as seen looking from the hybrid toward the central office, thereby adversely affecting the cancellation properties of the hybrid. The bridge taps can cause an impedance mismatch in the hybrid, and the impedance mismatch can cause signals in the upstream frequency range to be reflected into the downstream frequency range. The reflection can decrease the data transmission rate in the downstream direction.

Therefore, there exists a need to provide a better way to increase performance in an XDSL system.

SUMMARY OF THE INVENTION

In an XDSL transmission system, an XDSL modem can communicate with a central office. The XDSL modem can perform power spectral density shaping on upstream signals transmitted to the central office, and the power spectral density shaping may alter the power spectral density properties of the upstream signals. The XDSL modem may include an adjustable power spectral density shaping filter, which can be use to alter the power spectral density of the upstream signals. The power spectral density shaping filter may be a filter that can pass the upstream signals in a frequency range. The power spectral density shaping filter may be adjusted to alter, for example, roll off characteristics, power levels or to other characteristics of the upstream signals.

In another embodiment, the XDSL modem may also include a processor. The processor may control the adjustable power spectral density shaping filter. The processor may perform signal processing on the upstream signals in order to alter their power spectral densities, such as by altering roll off characteristics, power levels or other characteristics of the upstream signals.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
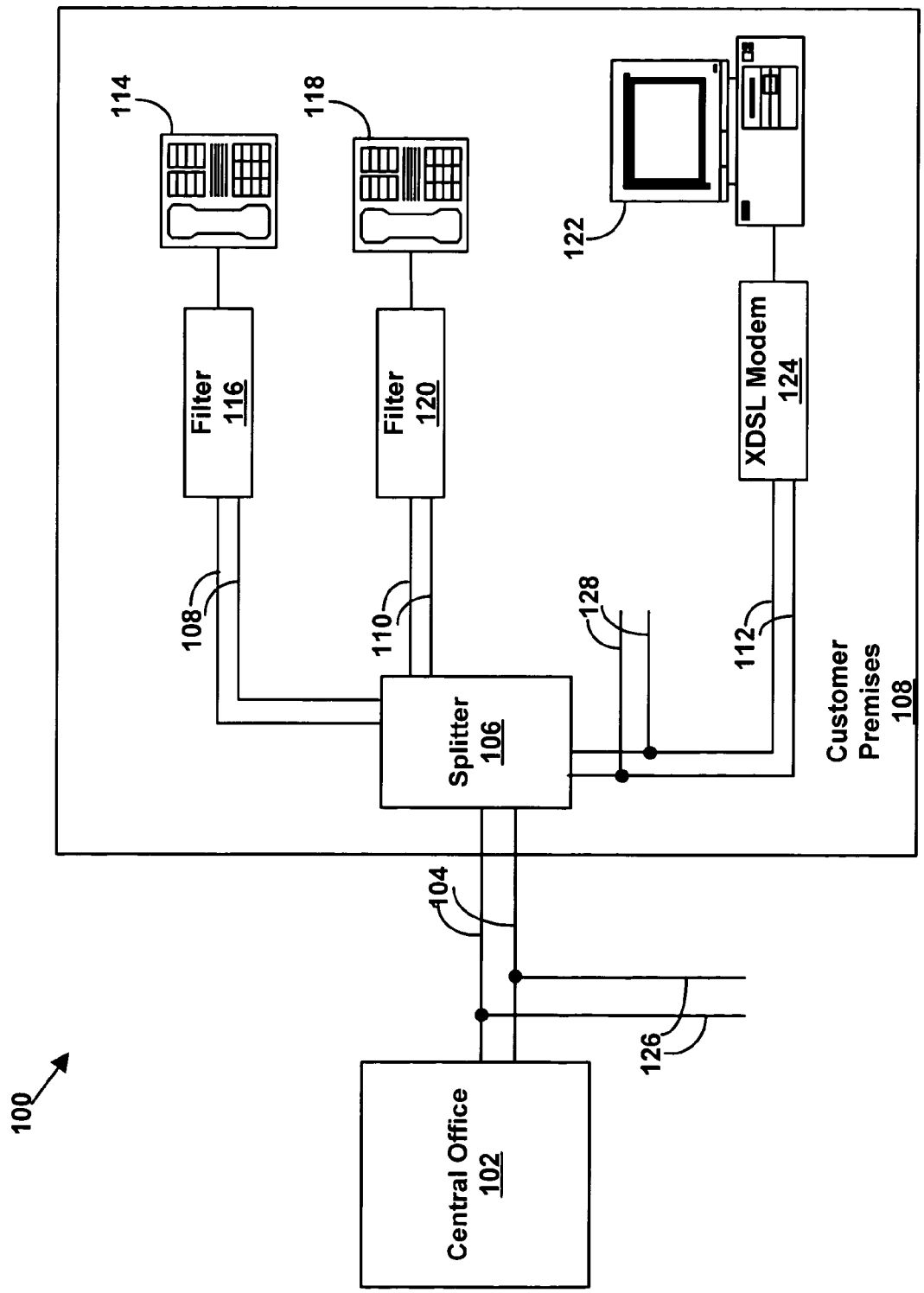
FIG. 1 is a block diagram of an XDSL system that can be used to practice the exemplary embodiments.

FIG. 1 shows an exemplary XDSL system 100 that can be used to practice the exemplary embodiments. A central office 102 connects through a transmission line 104 to a splitter 106. The transmission line 104 is ordinarily a twisted-pair copper wire transmission line, such as the type use to provide plain old telephone service ("POTS"); however, other types of wiring may also be used.

The transmission line 104 connects to the splitter 106, which is ordinarily located at the interface between the central office 102 and a customer premises 108. As shown in FIG. 1, the splitter 106 can be located inside the customer premises 108 and connected to the transmission line 104. The splitter 106 may also be located outside the customer premises 108 and connected to the transmission line 104. While the splitter 106 is generally located at the entry point of the transmission line 104 into the customer premises 108, it can also be located at various other locations. For example, the splitter 106 may be located in a device located on the customer premises 108. The splitter 106 may also be located at other locations within the XDSL system 100, and the XDSL system 100 may include more than one splitter 106.

In addition to interfacing with the central office 102 through the transmission line 104, the splitter 106 can interface with one or more devices located on the customer premises 108. The splitter 106 generally provides an interface between the transmission line 104 and various customer premises wiring links 108, 110, 112. For example, the splitter may physically split the transmission line 104 into multiple customer premises wiring links 108, 110, 112, which can then run to one or more devices located within the customer premises 108. The devices in the customer premises 108 may be, for example, XDSL devices, POTS devices or other devices. Through the customer wiring links 108, 110, 112, the devices can connect with the splitter 106 and ultimately with the central office 102.

The splitter 106 can connect to one or more XDSL devices within the customer premises 108. As illustrated in FIG. 1, the splitter 106 connects to an XDSL computer 122 over a customer wiring link 112. The connection between the splitter 106 and the XDSL computer 122 can be made through an XDSL modem 124. The XDSL modem 124 generally handles the XDSL signaling used for communication between the computer 122 and the central office 102. The XDSL modem 124 can receive signals sent over the transmission line 104, decode the signals and provide the signals to the computer 122. The XDSL modem 124 can also receive data from the computer 122, encode the data XDSL signals and send the signals over the customer wiring link 112 and the transmission line 104 to the central office 102.

While FIG. 1 depicts the XDSL modem 124 as a separate component from the computer 122, it may alternatively be integrated into the computer 122. Of course, the XDSL computer 122 is exemplary in nature, and other XDSL devices may also be used. Other XDSL devices can also connect to the splitter 106 via customer wiring links, and these devices may be in addition to or in place of the computer 122. While FIG. 1 depicts the computer 122 as a single XDSL device connected to the splitter 106, the splitter 106 may support a greater or fewer number of XDSL devices.

Two POTS telephones 114, 118 also connect to the splitter 106. One POTS telephone 114 connects to the splitter 106 over a customer wiring link 108, and another POTS telephone 118 connects to the splitter 106 over a customer wiring link 110. The two POTS telephones 114, 118, which do not support XDSL communication, can receive POTS service from the central office 102. In order to communicate with the central office 102, the POTS telephones 114, 118 use the same transmission line 104 that is used for XDSL communication with the computer 122. While FIG. 1 depicts two POTS devices 114, 118 connected to the splitter 106, a greater or fewer number of POTS devices may be connected to the splitter 106.

Each POTS device 114, 118 can connect to the customer wiring links 108, 110 through a filter 116, 120. One POTS telephone 114 connects to the customer wiring link 108 through a filter 116, and the second POTS telephone 118 connects to the customer wiring link 110 through another filter 120. The filters 116, 120 can be micro-data filters that appear as a high-impedance termination to the splitter 106. By isolating the POTS telephones 114, 118 from the splitter 106 as high-impedances, the filters 114, 118 can help prevent the POTS telephones 114, 118 from interfering with the XDSL signaling used by XDSL devices. While the filters 116, 120 in FIG. 1 are shown as separate components from the POTS telephones 114, 118, the filters 114, 118 may alternatively be integrated into the POTS telephones 114, 118. Other configurations of the filters 114, 118 are also possible.

In the XDSL system 100, the available bandwidth can generally be divided into three ranges. One range can be used to support POTS services, while the other two frequency ranges can be used to support XDSL services. An upstream frequency range can be used for XDSL communication from the customer premises to the central office, and a downstream frequency range can be used for XDSL communication from the central office to the customer premises. While upstream can refer to communication from the customer premises to the central office and downstream can refer to communication from the central office to the customer premises, it should be understood that upstream can generally refer to communication in a first direction and downstream can generally refer to communication in a second direction.

FIG. 1 also depicts a bridge tap 126 on the transmission line 104. The bridge tap 126 can be a non-terminated copper pair wire connected in parallel with the transmission line 104. While FIG. 1 illustrates a single bridge tap 126 connected to the transmission line 104, more than one bridge tap 126 can be connected to the transmission line 104. Alternatively, the transmission line may include no bridge taps 126. FIG. 1 also depicts a bridge tap 128 on the customer premises 108. The customer premises 108 may also include more than one bridge tap 128, or it may include no bridge taps 128. The bridge taps may also be placed at different locations on the transmission line 104 or within the customer premises 108.

Figure 2:
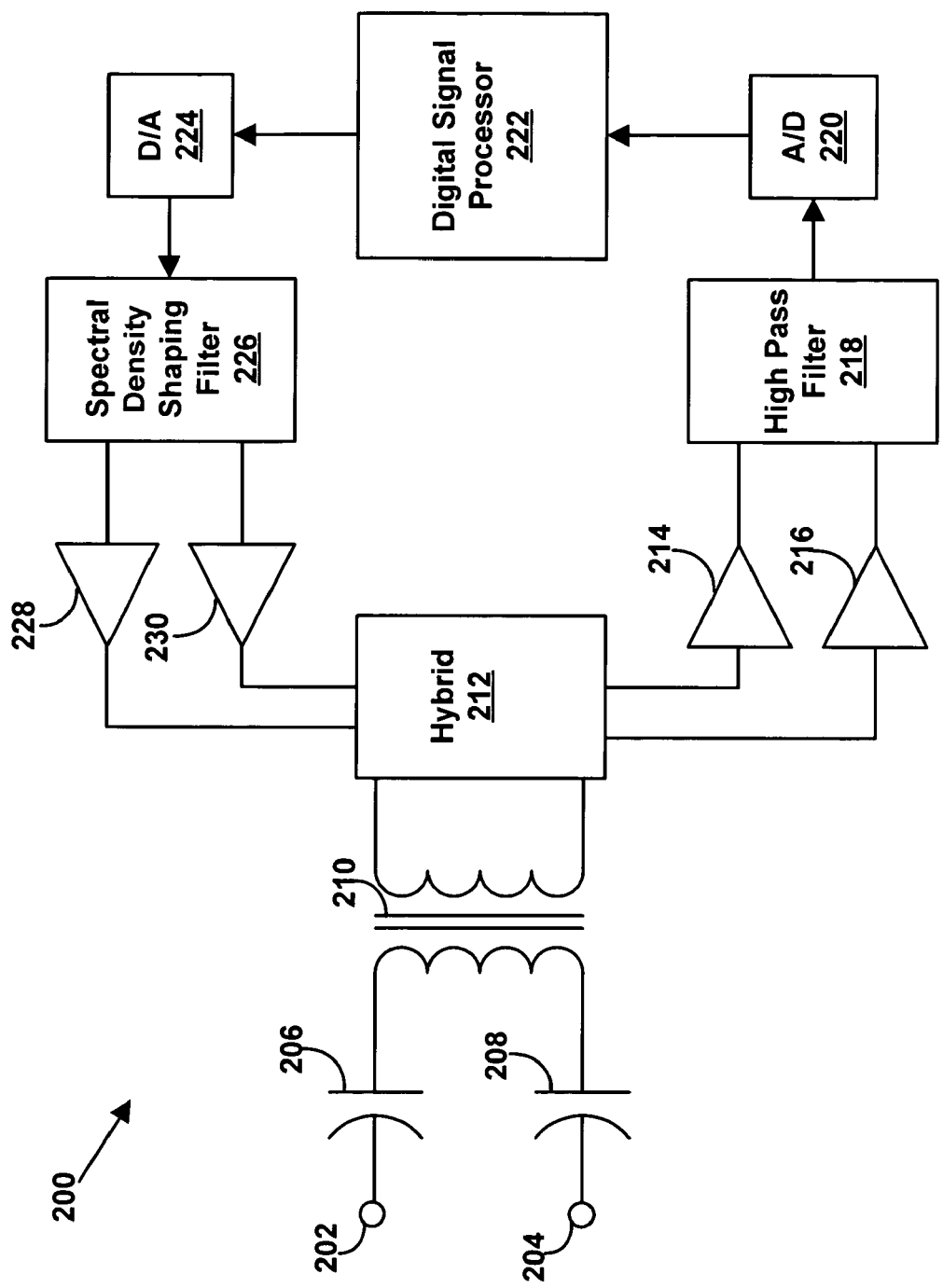
FIG. 2 shows an exemplary implementation of an XDSL modem using a power spectral density shaping filter.

FIG. 2 shows an exemplary implementation of an XDSL modem 200 that can be used as the XDSL modem 124 depicted in FIG. 1. The XDSL modem 200 includes two terminals 202, 204, which can connect to the customer premises wiring link 112. One terminal 202 connects in series with a capacitor 206, and the other terminal 204 also connects in series with a capacitor 208. The capacitors 206, 208 in turn connect to a transformer 210. One capacitor 206 connects to a first terminal of the transformer 210, while the other capacitor 208 connects a second terminal of the transformer 210.

The transformer 210 further connects to a hybrid 212. While the transmission line 104 and the customer wiring links 108, 110, 112 can use a 2-wire twisted pair configuration, the XDSL modem 200 generally uses a 4-wire configuration. The hybrid 212 can provide an interface between the 2-wire twisted pair line connecting to the XDSL modem 200 and the 4-wire configuration used within the XDSL modem 200.

The hybrid 212 can include an impedance designed to match the impedance of the transmission line 104. If the impedance of the hybrid 212 matches closely to the impedance of the transmission line 104, then the hybrid 212 may be able to effectively cancel transmit signals from the receive path of the XDSL modem 200. However, if the impedance of the hybrid 212 does not closely match the impedance of the transmission line 104, then transmit signals may reflect into the receive path. The reflection of transmit signals into the receive path may adversely affect the downstream transmission rate, and it may have particularly adverse effects in transmission systems where the transmit and receive signals share a common frequency band. The adverse effects of a mismatched hybrid may also be particularly adverse in transmission systems, such as ADSL, where the upstream and downstream frequency ranges are separated by small stopbands.

The hybrid 212 can have two outputs. One hybrid output can connect through a line driver 214 to a high pass filter 218, and the other hybrid output can connect through a line driver 216 to the high pass filter 218. The high pass filter 218 can produce an analog output that connects to an analog-to-digital converter ("A/D") 220. The A/D 220 can convert the analog signal received from the high pass filter 218 into a digital signal, and it can provide the digital signal to a processor, such as a digital signal processor ("DSP") 222.

The DSP 222 can perform many different functions within the XDSL modem 200. For example, the DSP 222 may receive and decode XDSL signals sent from the central office 102, and it may provide these signals to the computer 122 or to another device connected to the XDSL modem 200. Similarly, the DSP 222 may receive data from the computer 122 or other device. The DSP 222 may encode the data into XDSL signals for transmission, and it may transmit the XDSL signals to the central office 102 using XDSL signaling protocols. The DSP 222 may also perform various other functions. In addition to the DSP 222, the processor may be a microprocessor, an application specific integrated circuit ("ASIC") or another logic device, or the functionality of the processor can be distributed among a combination of logic devices.

The DSP 222 can provide a digital output to a digital-to-analog converter ("D/A") 224. The D/A 224 can receive the digital signal from the DSP 222 and convert it to an analog signal. The analog signal can then be provided as an input to a spectral density shaping filter 226, which can filter the analog signal. The spectral density shaping filter 226 can be used to adjust the spectral density properties of the analog signal, and the adjustments can be made based on conditions in the XDSL system 100. Selectively adjusting the power spectral density properties of the analog signal based on XDSL line conditions can reduce interference between the upstream frequency range and the downstream frequency range, thereby increasing the data transmission rate in the downstream frequency range.

The spectral density shaping filter 226 can provide two outputs. Each output can connect through a line driver 228, 230 to the hybrid 212. The hybrid 212 can transmit the signals received from the spectral density shaping filter 226 through the transformer 210 and capacitors 206, 208 to the customer wiring 112. Then, the signal can be sent through the transmission line 104 to the central office 102.

The hybrid 212 is generally matched to the impedance looking from the XDSL modem 200 toward the central office 102. The hybrid 212 receives an upstream signal from the DSP 222 to transmit to the central office 102. Likewise, the hybrid 212 can receive downstream signals coming from the central office 102, and it can provide those signals to the DSP 222. If however, the hybrid 212 is not properly matched to the impedance looking toward the central office 102, the hybrid 212 may not be able to effectively cancel upstream signals from those received from the customer wiring 112 and sent to the DSP 222.

The reflection of the upstream signals into the downstream frequency range may adversely affect the downstream transmission rate. The upstream signals in the downstream frequency range can appear as noise, thereby lowering the signal-to-noise margin in the downstream frequency range. The data transmission rate in the downstream frequency range generally corresponds to the signal-to-noise margin, with a decrease in the signal-to-noise margin causing a decrease in the data transmission rate.

While the hybrid 212 may be designed based on an anticipated impedance looking toward the central office 102, changing conditions within the XDSL system 100 can alter the actual impedance and create a mismatch. For example, bridge taps can change the impedance looking toward the central office 102 from the hybrid 212. The number of bridge taps, the length of bridge taps, the location of the bridge taps and the type of wire used in the bridge taps can all affect the impedance looking toward the central office 102. Other conditions within the XDSL system 100 may also alter the impedance.

Table 1 shows exemplary complex impedances of a cable with and without a bridge tap. Of course, such values may vary from the exemplary values. In the exemplary complex impedances shown in Table 1, the bridge tap corresponding to the values in the table is located directly at the XDSL modem 200.

TABLE 1

| Frequency | 16KFT 26AWG 0FT BT | 16KFT 26AWG 500FT BT |
| --- | --- | --- |
| 30 kHz | 149 − 95j | 108 − 104j |
| 40 kHz | 138 − 78j | 96 − 90j |
| 50 kHz | 132 − 66j | 88 − 81j |
| 100 kHz | 122 − 38j | 63 − 62j |

TABLE 1-continued

| Frequency | 16KFT 26AWG 0FT BT | 16KFT 26AWG 500FT BT |
|---|---|---|
| 150 kHz | 119 − 27j | 42 − 50j |
| 200 kHz | 117 − 22j | 28 − 33j |
| 250 kHz | 116 − 19j | 22 − 12j |
| 300 kHz | 118 − 17j | 28 + 10j |
| 400 kHz | 115 − 14j | 57 + 27j |
| 500 kHz | 115 − 13j | 84 + 10j |
| 600 kHz | 114 − 12j | 82 − 19j |

For an ADSL system, the frequency range from approximately 100 kHz to 250 kHz can be of importance for frequency hybrid cancellation. As illustrated by Table 1, the cable impedance values change based on the frequencies carried by the cable, and the location of the bridge tap can also cause a variation in the impedance. Also as illustrated by Table 1, the impedance of the cable switches from capacitive to inductive around 300 kHz. These values are exemplary in nature; they may change based on many different network conditions, including the length, location, wire type and number of bridge taps.

The XDSL modem 200 generally synchronizes with the central office 102 to determine a data transmission rate for the upstream and downstream frequency ranges. The XDSL modem 200 can perform synchronization with the central office 102 using a variety of predetermined protocols, such as T1.413. The XDSL modem 200 can use different methods to establish the data transmission rates. In one method, the XDSL modem 200 can attempt to synchronize with the central office 102 and establish predetermined data transmission rates for the upstream and downstream frequency ranges. In another method, the XDSL modem 200 can synchronize with the central office using an adaptive rate mode, which can allow the upstream and downstream data transmission rates to vary based on various XDSL system 100 conditions, such as signal-to-noise margins.

When the XDSL modem 200 uses the adaptive rate mode, the XDSL modem 200 generally synchronizes with the central office 102 at the fastest data rate possible based on loop conditions and margin settings in the XDSL system 100. The loop conditions and margin settings can affect the upstream and downstream data transmission rates. For example, bridge taps can alter the efficiency with which the hybrid 212 isolates upstream signals from the downstream frequency range, thereby decreasing the downstream transmission rate. As another example, noise on the customer premises wiring links 108, 110, 112 or on the transmission line 104 can also reduce the data transmission rates. Margin conditions, such as specified minimum signal-to-noise margins can also limit the data transmission rates. Based on the loop conditions and margin settings, it is possible that the upstream data rate could exceed the downstream data rate on loops longer than about 15 KFT of 26 AWG cable.

As the impedance looking toward the central office 102 changes and causes a hybrid 212 mismatch, the data transmission rate on the downstream channel may change, and the XDSL modem 200 may synchronize with the central office 102 at a lower transmission rate. For many XDSL applications, it can be beneficial to have the downstream transmission rate exceed the upstream transmission rate. For example, Internet users ordinarily download more information than they upload. This can create an incentive to have a greater downstream transmission rate than the upstream transmission rate. Therefore, it would be advantageous to adjust the data transmission rates to compensate for the adverse XDSL system 100 conditions that may cause a decrease in the downstream transmission rate.

One way to adjust the data transmission rates in the upstream and downstream frequency ranges is by using the power spectral density shaping filter 226. The power spectral density shaping filter 226 can alter the power spectral density of the upstream signal in order to reduce the interference of the upstream signals with the downstream signals, thereby increasing the transmission rate in the downstream frequency range. The increase in the downstream transmission rate may cause a corresponding decrease in the upstream data rate. Through this technique, the upstream transmission rate and the downstream transmission rate can be balanced.

Figure 3A:
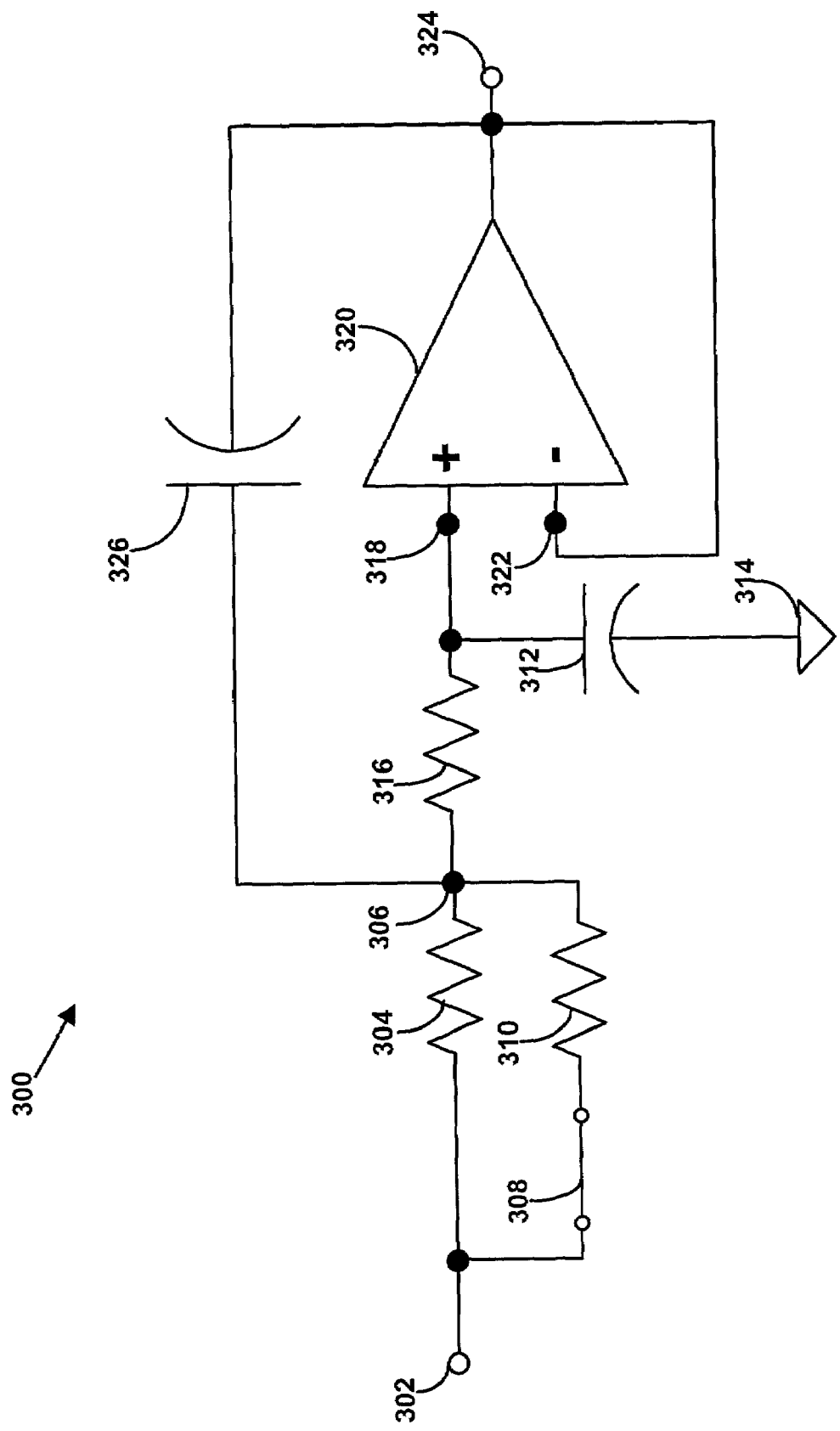
FIG. 3A shows an exemplary power spectral density shaping filter using a switch in a closed position.

FIG. 3A shows an exemplary power spectral density shaping filter 300 that may be used as the power spectral density shaping filter in FIG. 2. An input terminal 302 can receive input, such as from the D/A 224. The input terminal 302 connects through a resistor 304 to a node 306. The input terminal 302 also connects to the node 306 through a switch 308 and a resistor 310. The switch 308 and the resistor 310 are in series with each other, and they are in parallel with the other resistor 304. The node 306 also connects through a resistor 316 to a positive input terminal 318 of an op amp 320. The positive input terminal 318 connects through a capacitor 312 to a common ground 314. A negative input terminal 322 of the op amp 320 connects to an op amp output, which is also electrically connected to an output terminal 324. The output terminal 324 connects to a capacitor 326, which in turn connects with the node 306. The output terminal 324 can provide the output of the filter 200 to another device, such as the line driver 228, 230. spectral density shaping filter 300. The values can be changed to alter the frequency range, or they can also be changed to alter the roll off characteristics of the power spectral density shaping filter 300. Changing the values can also alter other properties of the power spectral density shaping filter 300. The component values are exemplary for an ADSL system having a specified upstream and downstream frequency range. In another system with different transmission frequency ranges, these values may be different.

Figure 3B:
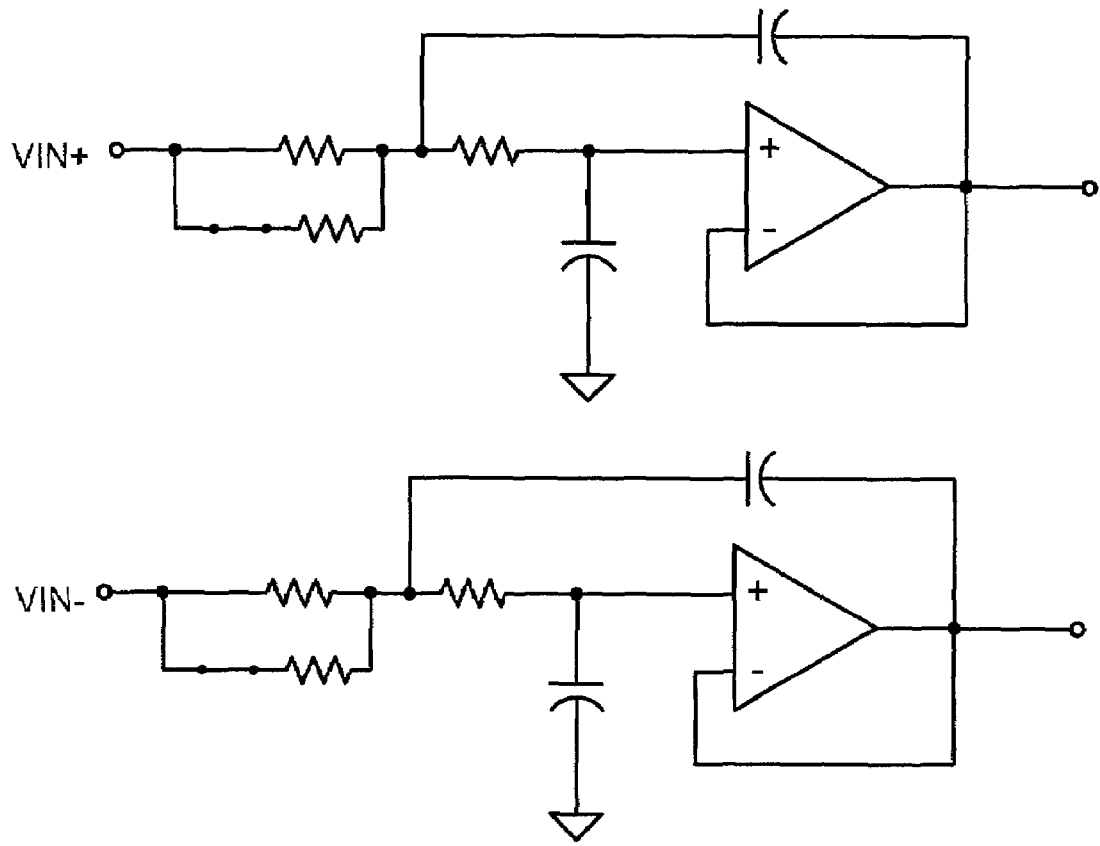
FIG. 3B shows the power spectral density shaping filter of FIG. 3A in a differential pair configuration.

The power spectral density shaping filter 226 shown in FIG. 2 can receive a single input from the D/A 224. The transmit path, however, can be a differential pair design, and the power spectral density shaping filter 226 may connect to two line drivers 228, 230. To support the differential pair design, the spectral density shaping filter 226 may include two of the power spectral density shaping filters described in FIG. 3A in a differential pair configuration. FIG. 3B illustrates two of the power spectral density shaping filters of FIG. 3A in a differential pair configuration. One output of the differential pair configuration can connect to one line driver 228, and the other output of the differential pair configuration can connect to the other line driver 230.

Figure 4:
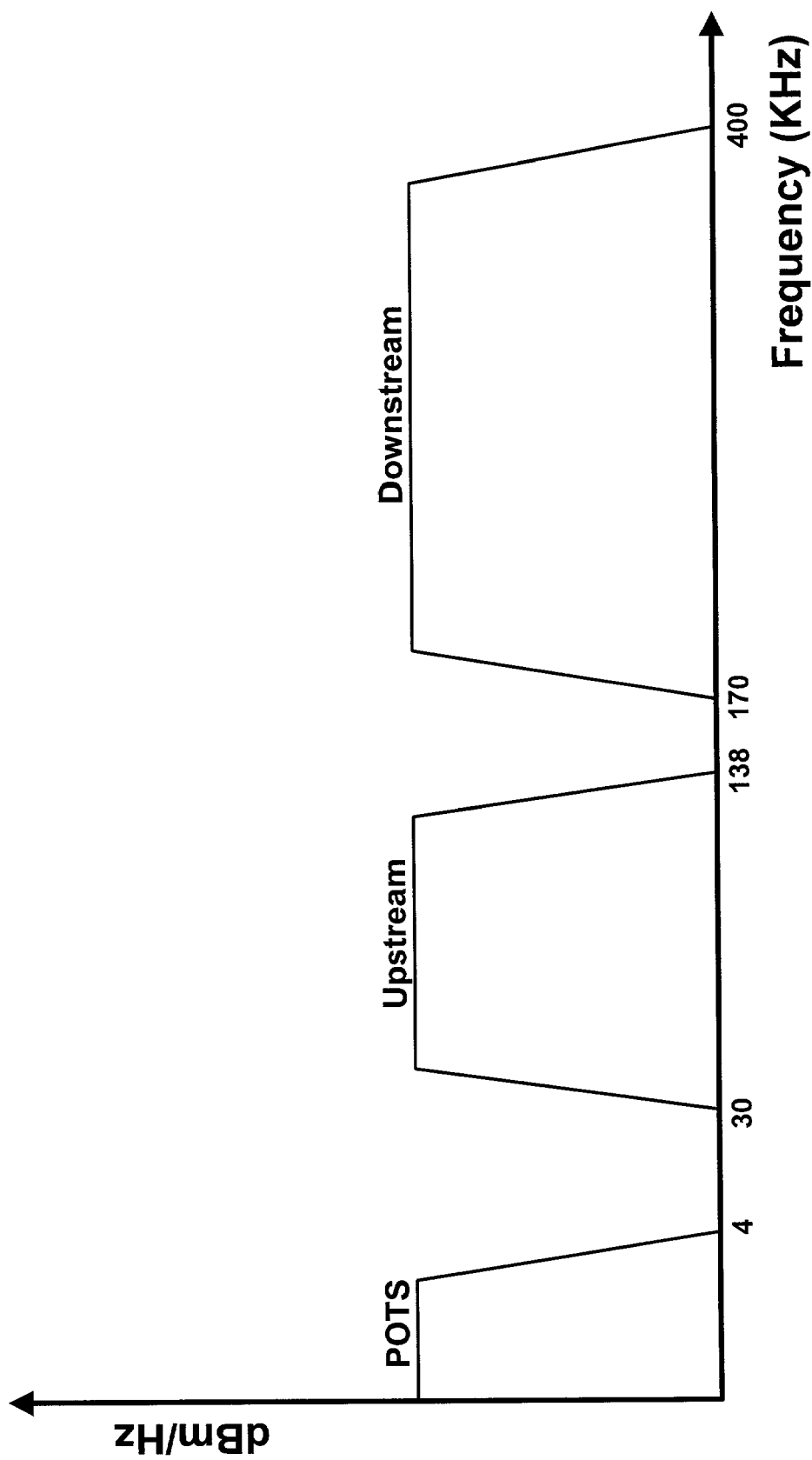
FIG. 4 shows an exemplary ADSL signal spectrum for the power spectral density shaping filter of FIG. 3.

FIG. 4 shows an exemplary ADSL signal spectrum for the power spectral density shaping filter of FIG. 3A operating with the switch 308 in the closed position. POTS signals are transmitted in the frequency range from approximately 0 kHz to 4 kHz. An upstream and a downstream frequency band can both carry ADSL signals. The upstream frequency band includes the frequencies from approximately 30 kHz to 138 kHz, and the downstream frequency band includes the frequencies from approximately 170 kHz to 400 kHz. The three transmission bands are separated by stopbands, which The switch 308 can be an analog switch, such as one with low harmonic distortion. It can also be a relay or another type of device. The switch 308 may be controlled by the DSP 222, or it can be controlled by another component. The switch 308 generally has two positions—open and closed. In the closed position the switch 308 connects the input terminal 302 and the resistor 310. Current can flow from the input terminal 302 through the switch 308 and the resistor 310 to the node 306. Current can also flow from the input terminal 302 through the resistor 304 to the node 306.

In the closed position, the power spectral density shaping filter 300 can act as a filter, and it can generally pass signals within a specified frequency range. It can also filter out signals that are not within the specified frequency range. The filter, however, does not perform ideally at the edges of the frequency range. The filter can roll off at the frequency range edges and gradually reduce the signal. The rate of roll off and the starting frequency of the roll off can be generally determined by its component values, such as by setting those components in the power spectral density shaping filter 300.

Table 2 shows exemplary component values for the power spectral density shaping filter 300. Of course, these values are exemplary in nature and other values may also be used.

TABLE 2

| Component | Value |
|---|---|
| Resistor 304 | 5 kΩ |
| Resistor 310 | 2.15 kΩ |
| Capacitor 312 | 680 pF |
| Resistor 316 | 845 Ω |
| Capacitor 326 | 2200 pF |

The various component values for the power spectral density shaping filter 300 may be changed, and changing the values of the components can alter the operation of the power generally do not carry data. The POTS frequency band and the upstream frequency band are separated by a stopband of approximately 4 kHz to 30 kHz. The upstream frequency band and the downstream frequency band are separated by a stopband of approximately 138 kHz to 170 kHz. The transmission bands and stopbands depicted in FIG. 4 are for an exemplary ADSL system. Other XDSL systems may have a different signal spectrum.

Figure 5:
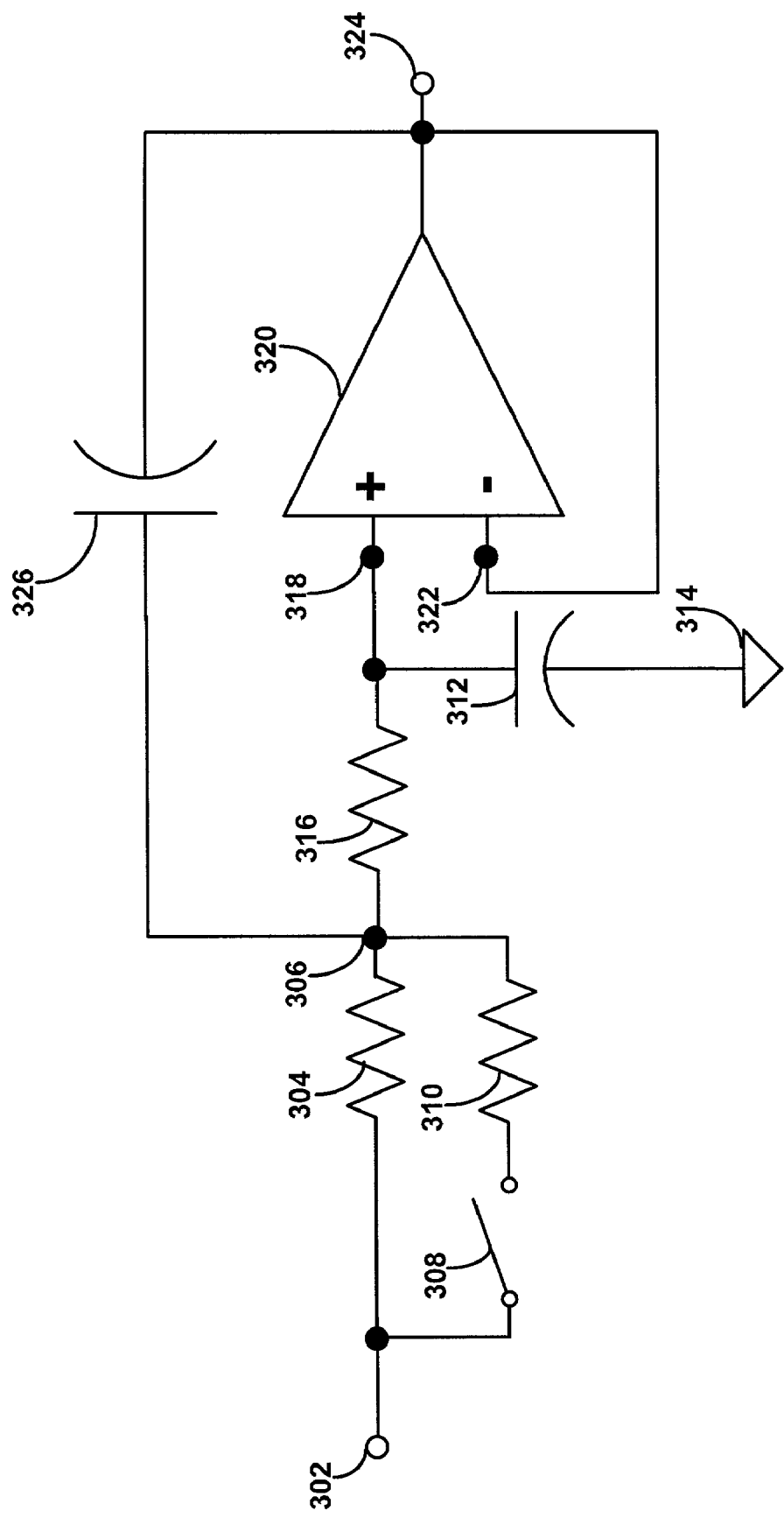
FIG. 5 shows the exemplary power spectral density shaping filter of FIG. 3 operating with the switch in an open position.

FIG. 5 shows the exemplary power spectral density shaping filter of FIG. 3 operating with the switch 308 in the open position. When the switch 308 is open, it creates a gap between the input terminal 302 and the resistor 310. The gap prevents current from flowing through the switch 308. Therefore, in this position no current flows from the input terminal 302 through the switch 308 and the resistor 310 to the node 306. In the open position, however, current can still flow from the input terminal 302 through the other resistor 304 to the node 306. With the switch 308 open, the power spectral density shaping filter can still act as a filter; however, allowing current to flow through both branches can alter filtering properties of the power spectral density shaping filter, for example by changing the roll off characteristics of the filter.

Figure 6:
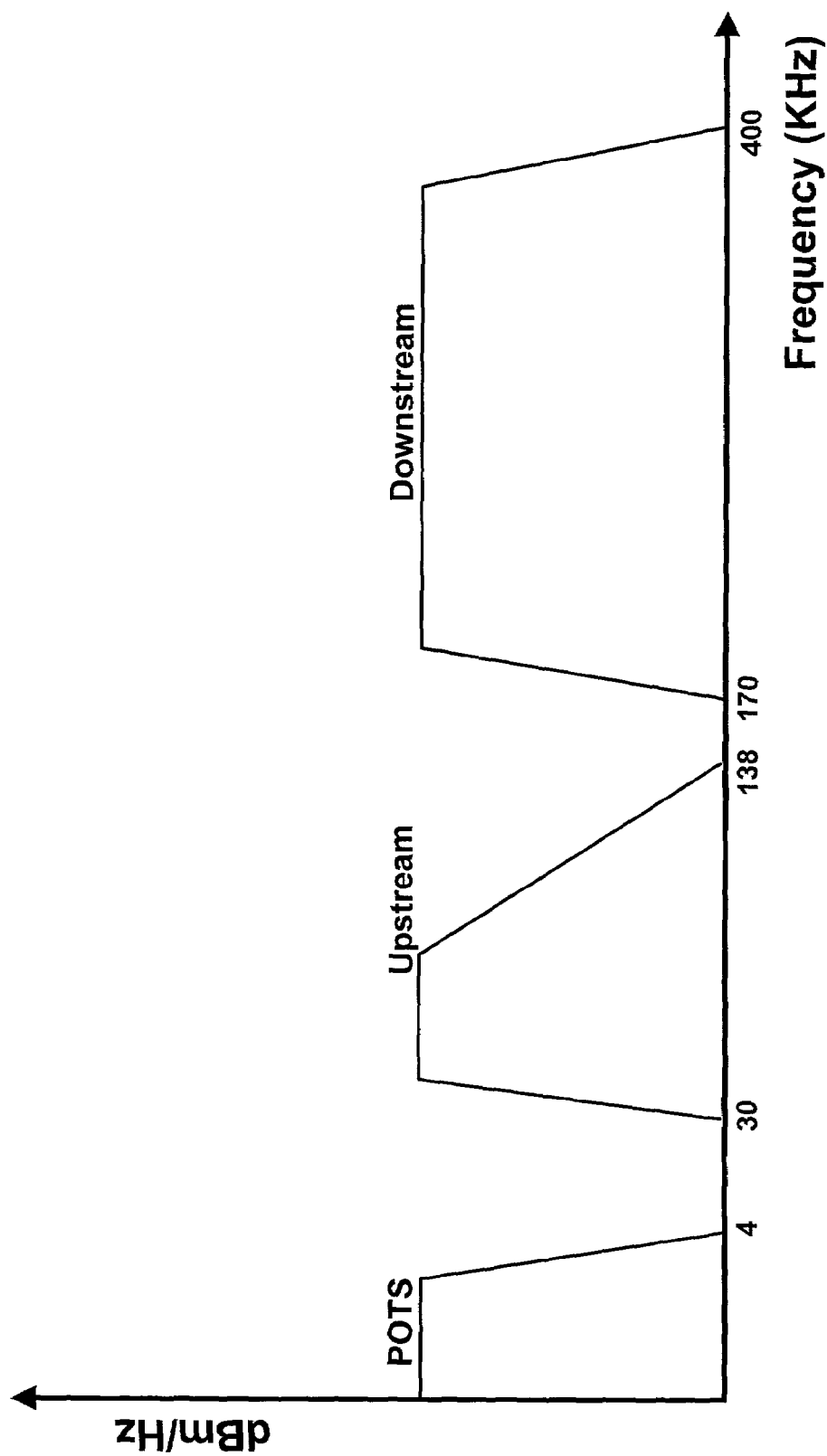
FIG. 6 shows an exemplary ADSL signal spectrum for the power spectral density shaping filter of FIG. 5.

FIG. 6 shows an exemplary ADSL signal spectrum for the power spectral density shaping filter of FIG. 5 operating with the switch 308 in the open position. POTS devices operate in the frequency range from approximately 0 kHz to 4 kHz. The upstream frequency band includes the frequencies from approximately 30 kHz to 138 kHz, and the downstream frequency band includes the frequencies from approximately 170 kHz to 400 kHz. The three transmission bands are also separated by stopbands.

The power spectral density shaping filter can assist the hybrid 212 by increasing the stopband between the upstream and downstream frequency ranges. Since the upstream signal stopband between the upstream and downstream frequency ranges can be more highly attenuated by the power spectral density shaping filter, the hybrid 212 may have to perform less cancellation. Ordinarily, the downstream transmission rate will increase since the hybrid can more efficiently cancel upstream signals from the downstream frequency range. The increase in the downstream transmission rate will generally correspond to a decrease in the upstream transmission rate, since more of the upstream signals will be attenuated. Power spectral density shaping can preferably be used when the upstream transmission rate or margin has more capacity than is being used by the XDSL modem or when the downstream transmission rate is limited due to external conditions, such as bridge taps. Since a greater downstream transmission rate is typically preferred, the power spectral density shaping can preferably be used when the downstream transmission rate is equal to or less than the upstream transmission rate.

Operating with the switch 308 in the open position, however, can alter the roll off characteristics of the upstream transmission band. As shown in FIG. 6, the power spectral density shaping filter begins rolling off the upstream frequency range at a lower frequency. This can cause the upstream signals to have less power at the higher frequencies in the upstream frequency range, because their signals are more highly attenuated by the power spectral density shaping filter. Lowering the power in this manner can decrease the interference between the upstream frequency band and the downstream frequency band; however, it may also decrease the data transmission rate of the upstream frequency band.

Figure 7:
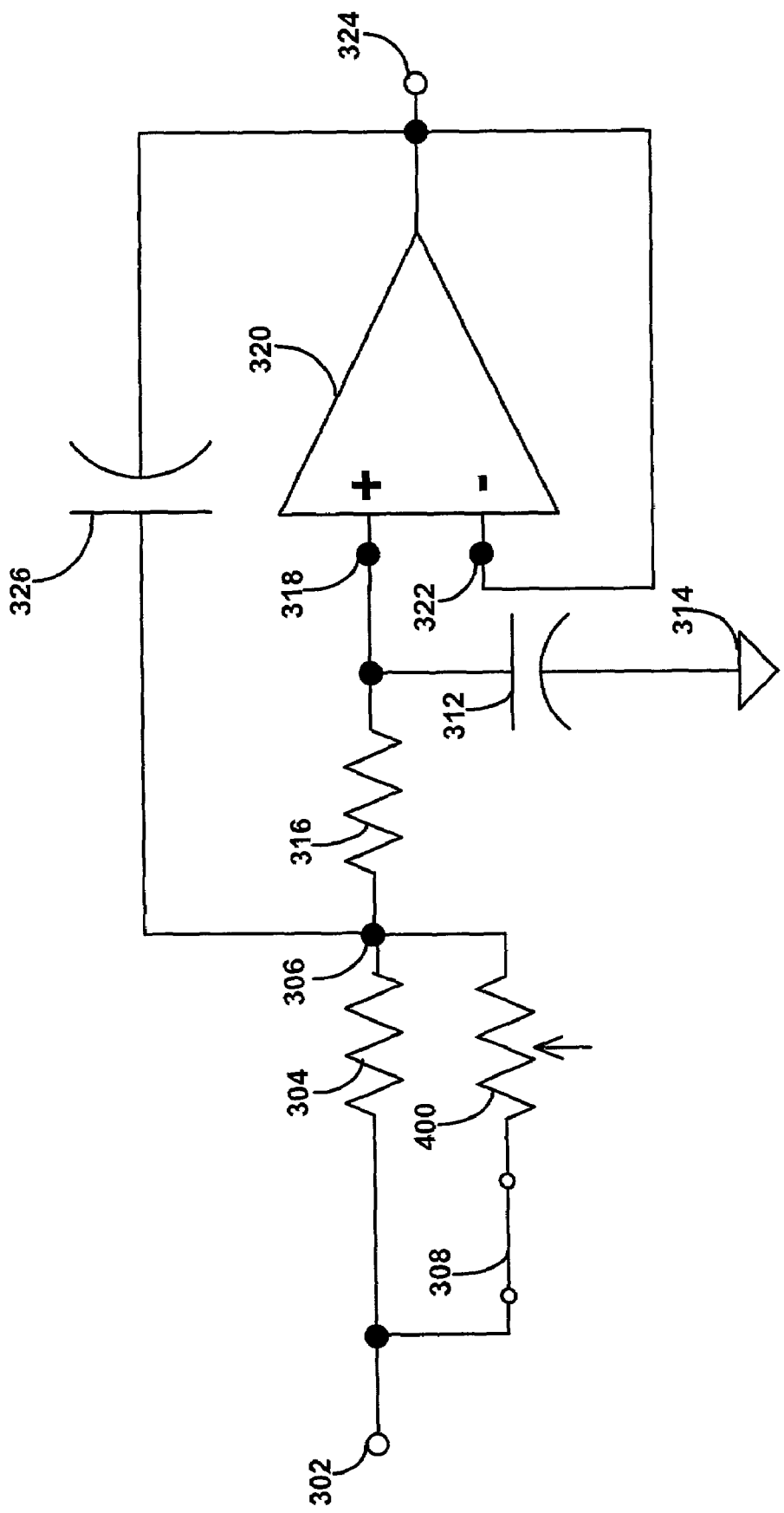
FIG. 7 shows an alternate implementation of a power spectral density shaping filter using a potentiometer.

Various different changes can be made to the power spectral density shaping filter described in FIG. 3, and these changes may further alter the power spectral density characteristics of an inputted signal. FIG. 7 shows an alternate implementation of a power spectral density shaping filter using a potentiometer. A potentiometer 400 replaces the resistor 310, which was used in the implementation described in FIG. 3. The potentiometer connects between the switch 308 and the node 306. The potentiometer 400 can be a variable resistor, and its resistance can be varied across a range of different resistances. The potentiometer 400 can be controlled by the DSP 222 or by another controller. The potentiometer 400 can be used to further adjust the power spectral density shaping characteristics of the filter. For example, the potentiometer can be used to further adjust the roll off characteristics of the power spectral density shaping filter, such as by changing the frequency at which the roll off begins.

Figure 8A:
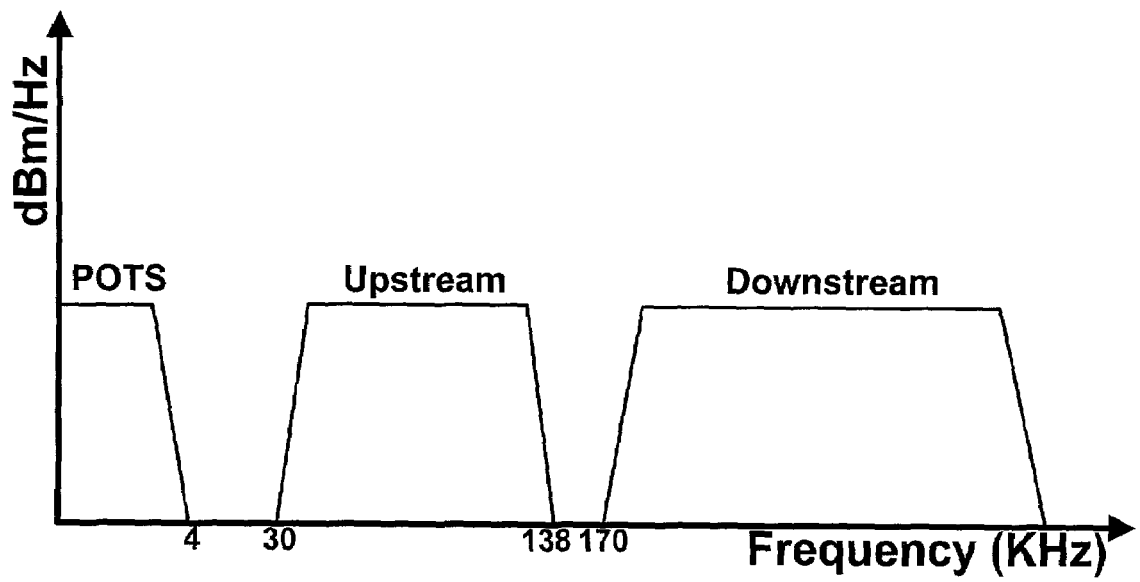
FIGS. 8A-8D shows exemplary ADSL signal spectra for the power spectral density shaping filter of FIG. 7 operating through various settings of the potentiometer.

FIGS. 8A-8D show exemplary ADSL signal spectra for the power spectral density shaping filter of FIG. 7 operating through various settings of the potentiometer 400. FIG. 8A shows an exemplary ADSL upstream frequency range for power spectral density shaping filter operating with the switch 308 in the closed position. With the switch 308 in the closed position, current flows through the potentiometer 400. This is similar to the operation of the power spectral density filter described in FIG. 3 and its corresponding signal spectrum shown in FIG. 4.

Figure 8B:
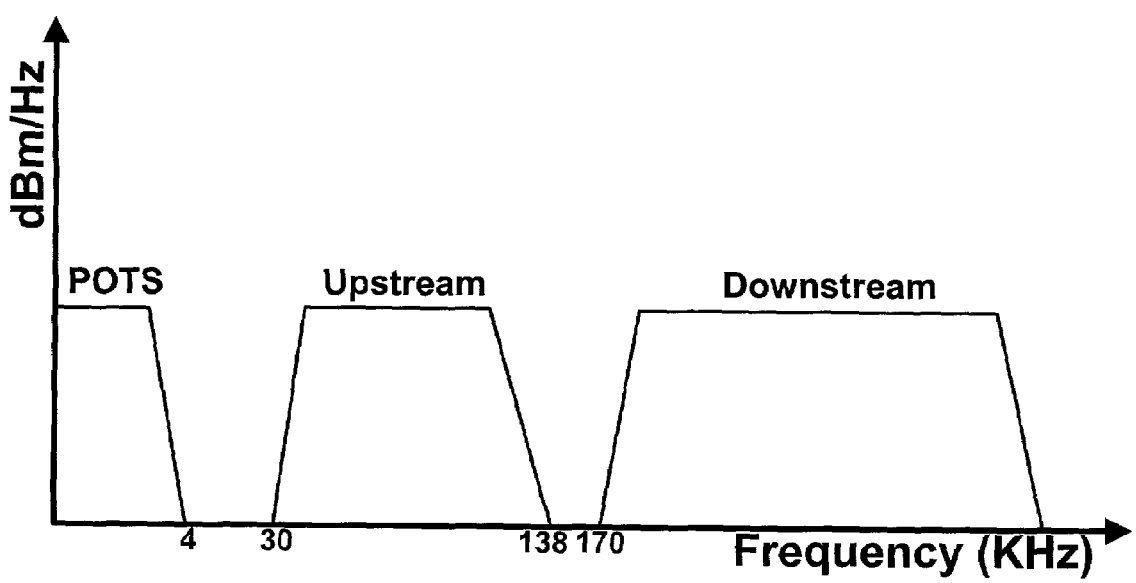

FIG. 8B shows an exemplary ADSL signal spectrum for the power spectral density shaping filter also operating with the switch 308 in the closed position but with a different resistance value of the potentiometer 400. The current flowing through the potentiometer 400 may change the roll off characteristics of the upstream frequency range. As illustrated in FIG. 8B, the potentiometer 400 can cause the upstream frequency range to start rolling off at a lower frequency than was depicted in FIG. 8A, thereby further reducing the power of the upstream signals in the frequencies closer to the downstream frequency range. This may be done, for example, by increasing the resistance of the potentiometer 400.

Figure 8C:
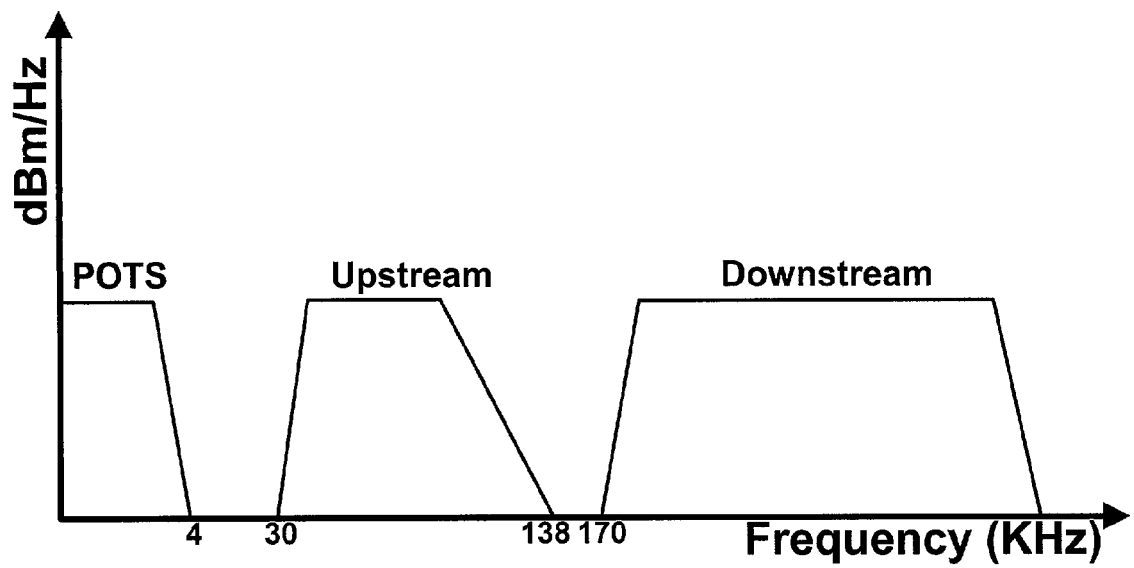

FIG. 8C shows an exemplary ADSL signal spectrum for another setting of the potentiometer 400. By changing the variable resistance of the potentiometer 400, such as by further increasing its resistance, the upstream frequency range can be adjusted to roll off at a lower frequency than previously depicted in FIG. 8B. The earlier roll off can further reduce the power of the upstream signals at frequencies closer to the downstream frequency range. The reduction in power can further reduce potential interference with the downstream frequency range, thereby allowing the downstream frequency range to operate at a higher transmission rate. The reduction in power, however, can reduce the upstream transmission rate.

Figure 8D:
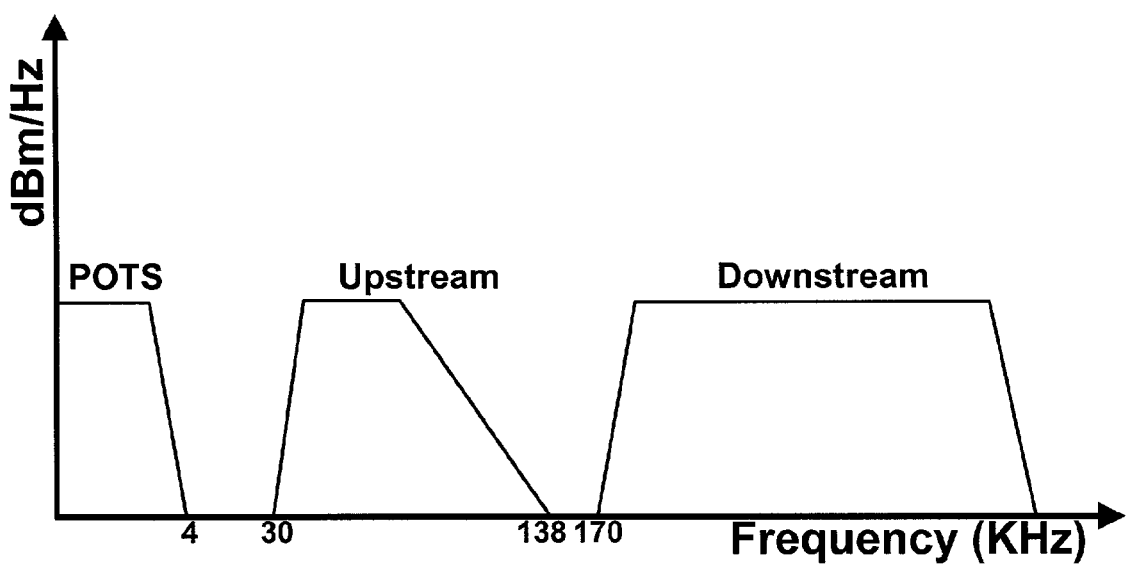

FIG. 8D shows an exemplary ADSL signal spectrum for yet another setting of the potentiometer 400. A further adjustment to the variable resistance of the potentiometer 400 can start the roll off of the filter and at even lower frequency than shown in FIGS. 8A-8C. For example, the resistance of the potentiometer may be further increased over its previous values. This can further reduce potential interference between the upstream frequency range and the downstream frequency range.

Other methods may also be used to adjust the power spectral density of a signal in the upstream frequency range. In one example of another method, the power across the upstream frequency range can be reduced. This results in a much lower amplitude signal in the transition band between the upstream and downstream XDSL spectrum. The lower amplitude signal in the stopband between the upstream and downstream XDSL spectrum can assist the hybrid 212 in echo cancellation, because less of the upstream signal is present to be cancelled from the downstream signal. In addition, this method allows for full power in the lower portions of the upstream spectrum to allow for full bit loading to maximize the upstream transmission rate. As a result, the downstream transmission rate increases with a corresponding decrease in the upstream transmission rate.

Figure 9:
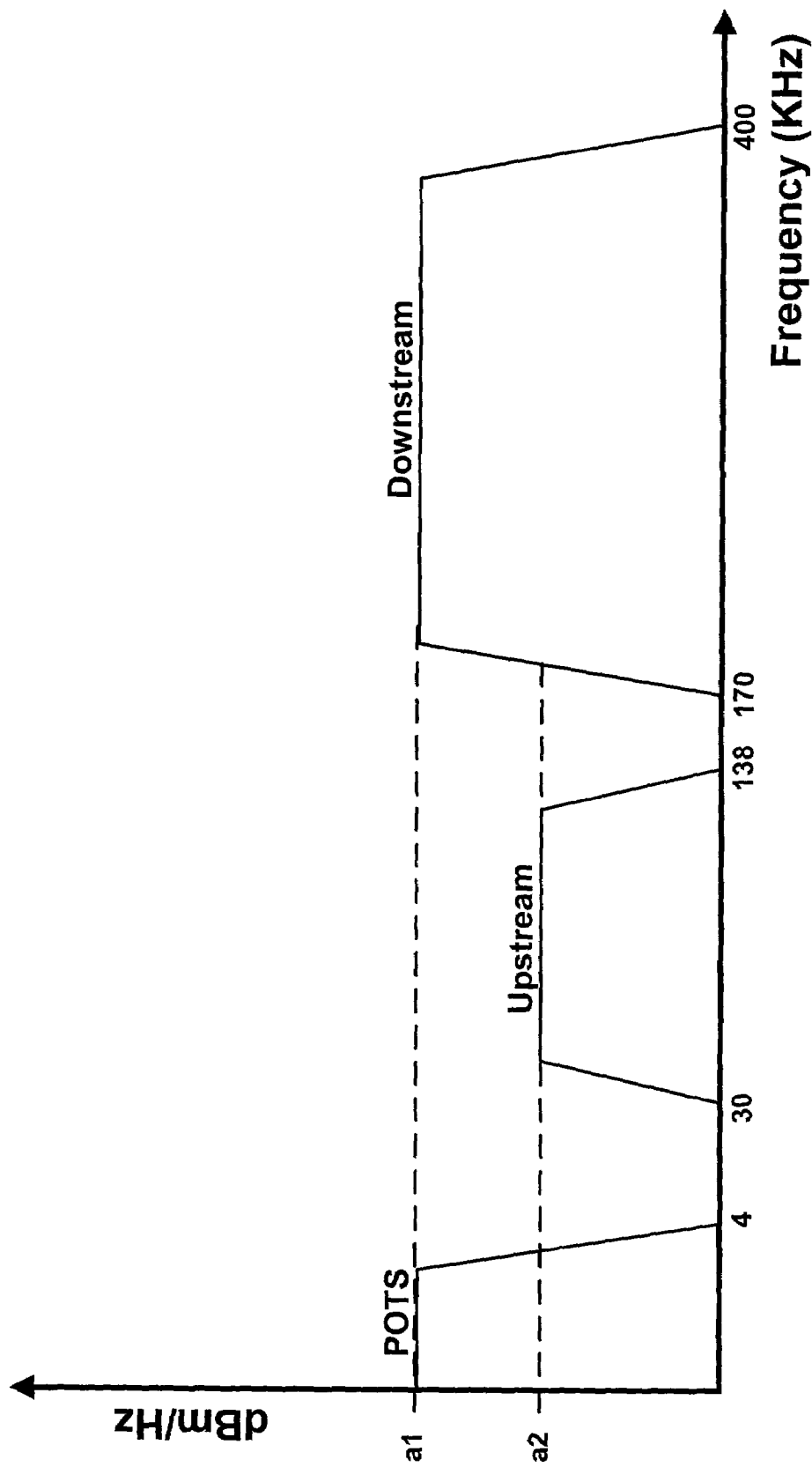
FIG. 9 illustrates an exemplary ADSL signal spectrum for an upstream frequency band with reduced power.

The power may be reduced across the upstream frequency range by adjusting the power spectral density filter. FIG. 9 illustrates an exemplary ADSL signal spectrum for an upstream frequency range with reduced power. The POTS and downstream frequency ranges have a power level of a1,while the power in the upstream frequency range is reduced to a power level of a2. The reduction of the power level of the upstream frequency range can reduce the interference with the downstream frequency range, thereby potentially increasing the transmission rate in the upstream frequency range.

Figure 10:
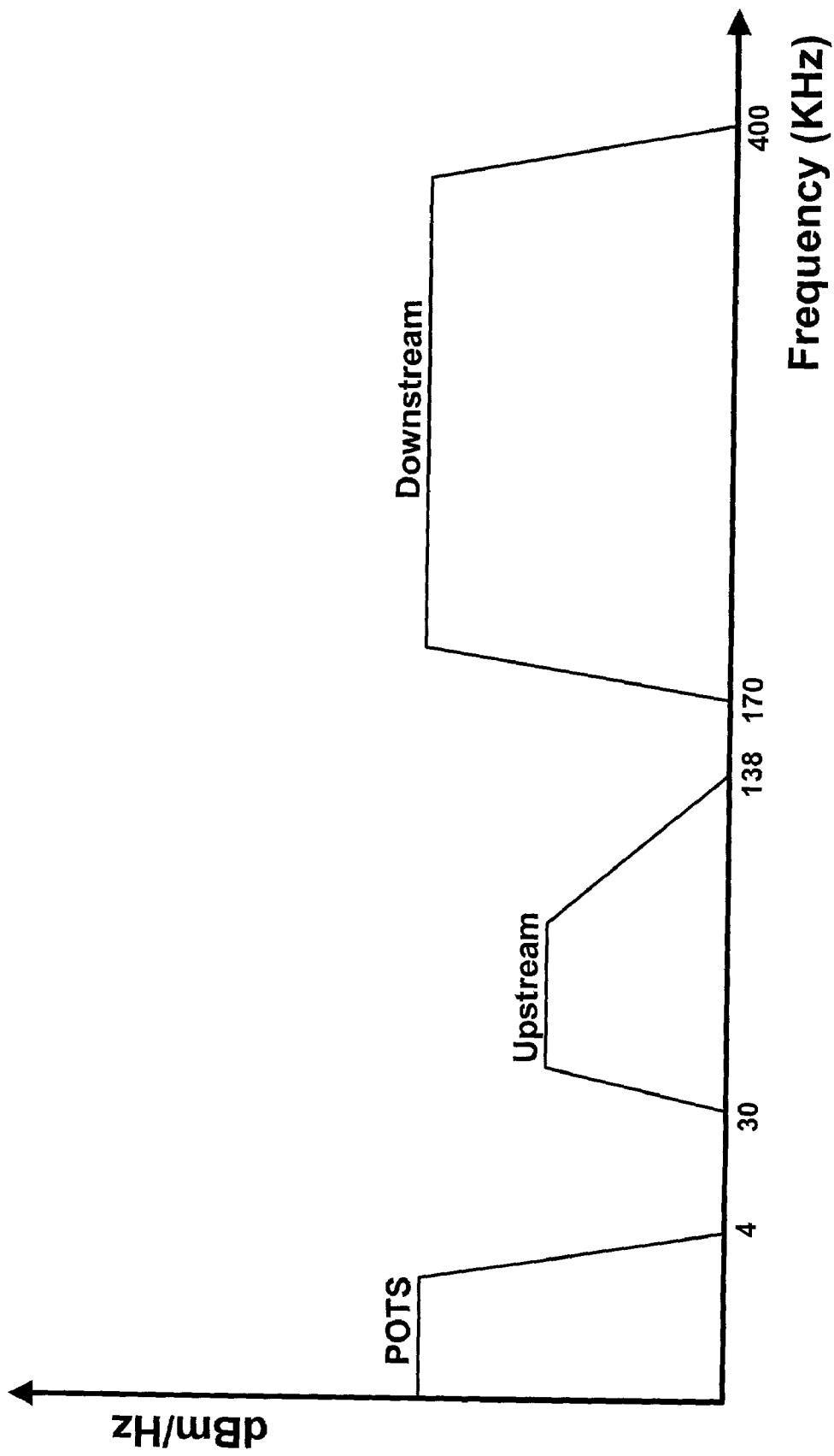
FIG. 10 shows an exemplary ADSL signal spectrum for an upstream frequency band having reduced power and altered roll off characteristics.

Reducing the power across the upstream frequency range may be used in conjunction with altering the roll off characteristics of the power spectral density shaping filter. FIG. 10 shows an exemplary ADSL signal spectrum for an upstream frequency range with reduced power and altered roll off characteristics. The amplitude of the upstream frequency range can be reduced from the amplitude used by the POTS devices and from the amplitude of the downstream frequency range signals. In addition to reducing the upstream frequency range power, the upstream frequency range can be adjusted to roll off starting at a lower frequency, thereby further reducing the power of the upstream signals in the frequencies closer to the downstream frequency range.

While the power spectral density shaping techniques can be performed by the power spectral density shaping filter 226, they could alternatively be performed by the DSP 222. The DSP 222 may receive data from the computer 122 to be transmitted to the central office 102. Then, the DSP 222 may form the data into XDSL signals to be transmitted over the transmission line 104 to the central office 102. However, before sending the signal to the D/A 224, the DSP 222 may alter the power spectral density characteristics of the signal.

For example, the DSP 222 may filter the signal to reduce the power of the signal in the frequencies close to the downstream frequency range, and this can have a similar affect as changing the roll off characteristic of the power spectral density filter. Since the signals sent from the DSP 222 to the D/A 224 have a reduced power in the frequencies closer to the downstream transmission band, the hybrid 212 can more efficiently cancel them from the downstream frequency range.

In another embodiment, the DSP 222 may reduce the power level of signals in the upstream frequency range. The DSP 222 may receive data from the computer 122 to be transmitted to the central office via the XDSL system 100. The DSP 222 may format the data into signals to be transmitted to the hybrid 212 and ultimately to the central office 102. Before transmitting the signals, the DSP 222 may reduce the power level across all or part of the upstream frequency range. This can advantageously reduce the interference between the upstream signals and the downstream signals, thereby allowing the downstream signals to be transmitted at a higher transmission rate.

The various spectral density processing performed by the DSP 222 may be performed using a processor and memory, and they may be controlled by software stored in the XDSL modem 200 and accessible by the DSP 222. Alternatively, the spectral density processing may be performed in hardware located in the DSP 222, or it may be performed using a combination of hardware and software.

In another embodiment, the DSP 222 may perform various other processing on the signals sent through the D/A 224 to the power spectral density shaping filter 226. For example, the DSP 222 may reduce the power across all or part of the upstream frequency range, and the DSP 222 may also shape the upstream signals by filtering the signals so that they roll off earlier.

In yet another embodiment, the DSP 222 may perform signal processing in conjunction with adjusting the power spectral density shaping filter 226. For example, the DSP 222 may reduce the power across the upstream transmission band, it may filter the signals so they roll off earlier, or it may perform both functions. Additionally, the power spectral density shaping filter 226 may reduce the power across the received signal, it may adjust the roll off characteristics of the signal, or it may perform both functions. Other variations are possible, and these may also be used.

The signal processing performed by the DSP 222 and adjustments to the power spectral density shaping filter may be made based on conditions within the XDSL system 100. In order to determine those conditions, for example, the XDSL modem 124 may perform synchronization when it establishes an initial connection with the central office 102. The XDSL modem 124 may also periodically synchronize with the central office 102 during a communication session, and this can allow the modem 124 to adapt to changing conditions within the XDSL system 100. During the synchronization process, the XDSL modem 124 can determine an upstream transmission rate and a downstream transmission rate to be used in communicating with the central office 102. As previously discussed, it may be advantageous to alter the filtering properties of XDSL signals in order to increase one of the transmission rates.

The DSP 222 may be programmed to evaluate the negotiated transmission rates and to alter the power spectral density of signals in the upstream frequency range. By altering the spectral density of signals in the upstream frequency range, the DSP 222 can increase the downstream transmission rate. The DSP 222 may decide to alter the power spectral density characteristics during the synchronization process, or it may decide to alter the power spectral density characteristics at a later time, for example in response to a user request.

As previously discussed, the DSP 222 can alter the power spectral density of upstream signals using any of the different ways previous discussed. For example, the DSP 222 may open the switch 308 in the power spectral density shaping filter of FIG. 3A. In another example, the DSP 222 may open the switch 308 in the power spectral density shaping filter of FIG. 5, and the DSP 222 may adjust the potentiometer 400.

Also as previously discussed, the DSP 222 may perform signal processing on the upstream signals before sending them to the power spectral density shaping filter 226 via the D/A 224. For example, the DSP 222 may filter the upstream signals using various different roll off characteristics. The DSP 222 may reduce the power level of the upstream signals across all or part of the upstream frequency range, or the DSP 222 may perform a combination of these approaches. In addition to performing signal processing on the upstream signals, the DSP 222 may also vary settings within the power spectral density shaping filter 226, such as the switch 308 positions or the potentiometer 400 settings.

Figure 11:
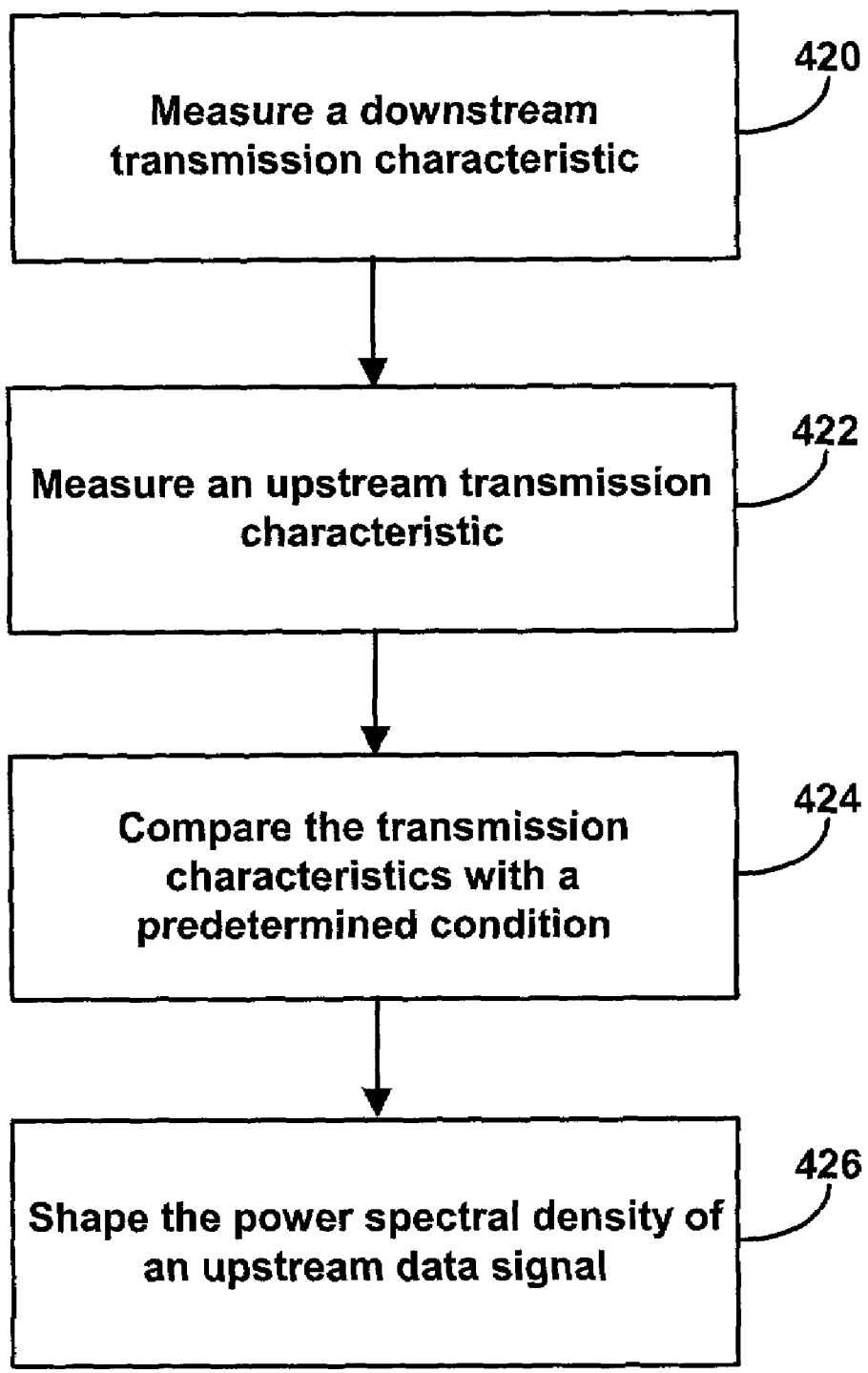
FIG. 11 is a flowchart of an exemplary method for adjusting a power spectral density filter.

FIG. 11 is a flowchart of an exemplary process for adjusting the power spectral density shaping filter. At Step 420, the XDSL modem measures a downstream transmission characteristic. The downstream transmission characteristic may be a signal-to-noise margin, a transmission rate or another characteristic. At Step 422, the XDSL modem measures an upstream transmission characteristic. The upstream transmission characteristic may also be a signal-to-noise margin, a data rate or another characteristics. While FIG. 11 depicts these as separate steps, they may be performed simultaneously, for example as part of the synchronization process. Also, the upstream transmission characteristic may be different from the downstream transmission characteristic. For example, the downstream transmission characteristic may be a signal-to-noise margin while the upstream transmission characteristic may be a data rate. Other combinations are also possible.

At Step 424, the XDSL modem compares the transmission characteristics with a predetermined condition. The predetermined condition may be, for example, preprogrammed preferred transmission rates. The preprogrammed preferred transmission rates may be based on settings specified by a modem user, settings specified by a modem manufacturer or settings specified from other sources. The transmission characteristics may be compared with the preprogrammed preferred transmission rates to determine if the XDSL system can support transmission rates equal to or greater than the preferred transmission rates. If the current XDSL modem settings do not allow the XDSL modem to communicate at or above the preferred transmission rates, then the XDSL modem may then determine one or more power spectral density settings that can be used to alter the data rates to meet the preferred transmission rates.

At Step 426, the XDSL modem may adjust the power spectral density filter to increase the downstream transmission characteristic so that it meets or exceeds the preferred transmission characteristic. This may be done using a variety of different methods. For example, the XDSL modem may open a switch to alter the roll off characteristics of the power spectral density filter. The XDSL modem may adjust a potentiometer in the power spectral density filter to adjust the roll off characteristics of the filter. The XDSL modem may decrease the power across all or part of the upstream frequency range.

Other variations to the method described in FIG. 11 are also possible. For example, at Step 424, the XDSL modem may determine whether the downstream transmission characteristic meets or exceeds a predetermined threshold. If the downstream transmission characteristic doesn't exceed the threshold, then at Step 456 the XDSL modem may open a switch or other element to alter the power spectral density characteristics of upstream signals. In another embodiment, at Step 426 the XDSL modem may perform signal processing on upstream signals before sending them to the power spectral density shaping filter. The signal processing may be in place of adjusting the power spectral density filter, or it may be performed in conjunction with adjusting the power spectral density filter. In yet another embodiment, at Step 424 the XDSL modem may alternatively determine that the upstream transmission rate is below a predetermined threshold. Then, at Step 426, the XDSL modem may adjust the power spectral density filter to decrease the downstream transmission rate and to increase the upstream transmission rate. In yet another embodiment, the XDSL modem only performs one of Step 420 or Step 422 to determine whether to apply power spectral density shaping. Many other variations may also be used.

Figure 12:
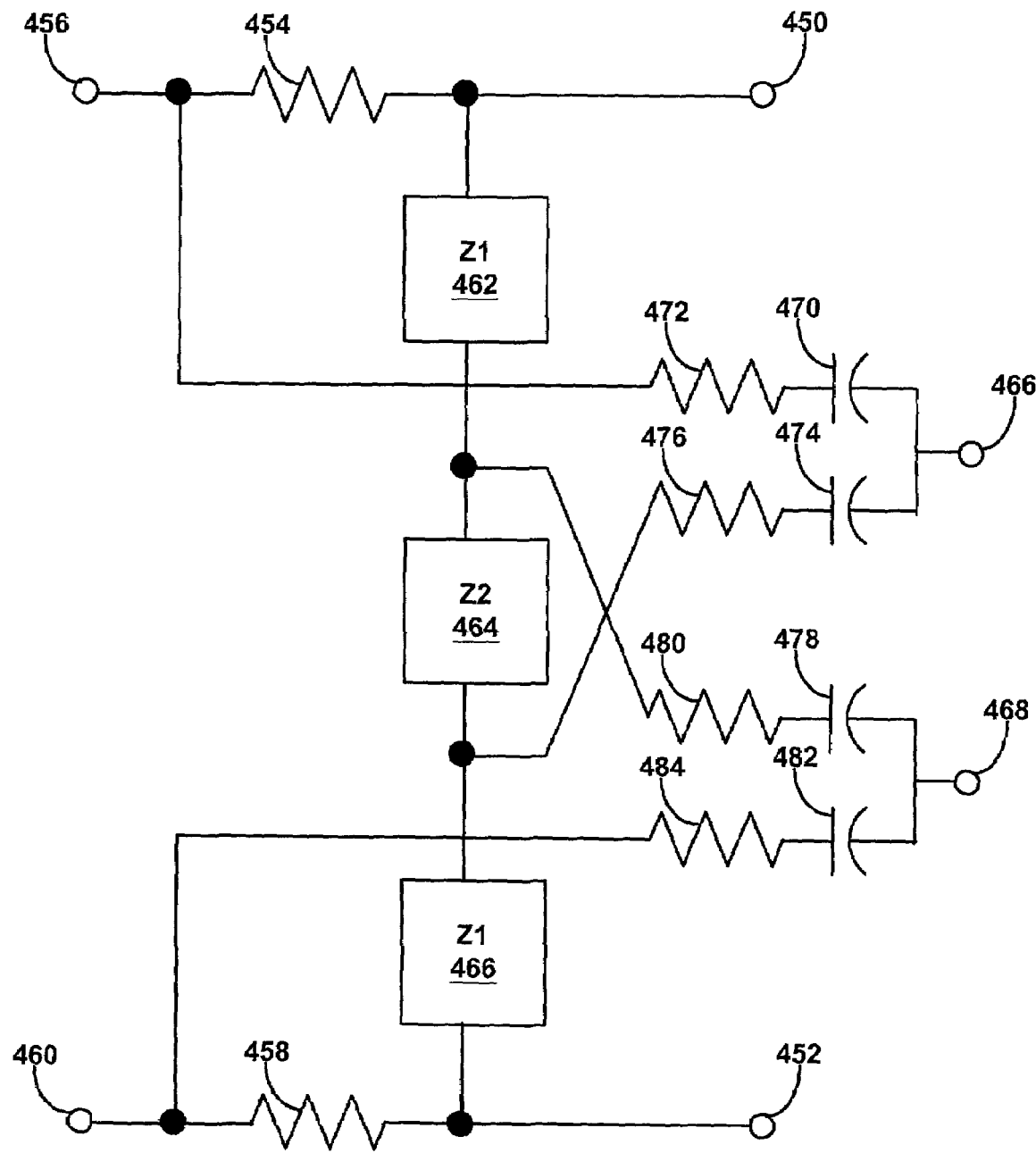
FIG. 12 is an exemplary implementation of an adjustable hybrid that may be used in the XDSL system of FIG. 1.

The hybrid 212 may be an adjustable hybrid 212, which can also be used to increase the performance of the XDSL system 100 in conjunction with power spectral density shaping. The adjustable hybrid 212 can include adjustable impedances, which can be used to more closely match the adjustable hybrid 212 with changing conditions in the XDSL system 100. For example, bridge taps can alter the impedance looking from the hybrid 212 toward the central office 102. By altering the impedance of the adjustable hybrid 212, its impedance can be more closely matched with the changes caused by the bridge taps or by other conditions. FIG. 12 illustrates an exemplary implementation of the adjustable hybrid 212.

The adjustable hybrid 212 can have two transmit terminals 450, 452. The first transmit terminal 450 can receive input from one line driver 228, and the second transmit terminal 452 can receive input from the other line driver 230. The adjustable hybrid 212 can have two output terminals. The first transmit terminal 450 can connect through a resistor 454 to the first output terminal 456, and second transmit terminal 452 can connect through a resistor 458 to a second output terminal. The output terminals 456, 460 can connect to the transformer 210, and the output terminals can be used to send and receive signals with the central office 102.

The first transmit terminal 450 connects to the second transmit terminal 452 through three impedances 462, 464, 466 in series with each other. One or more of the impedances 462, 464, 466 can be varied in order to change the operational characteristics of the adjustable hybrid 212. The impedances can be varied to more closely match the adjustable hybrid 212 with the impedance changes in the XDSL system 200 caused by bridge taps or other conditions. For example, the Z1 impedances 462, 466 may be fixed impedances and the Z2 impedance 464 may be a variable impedance.

The adjustable hybrid 212 can have two receive terminals 466, 468. The first receive terminal can connect through a capacitor 470 and a resistor 472 to the first output terminal 456. The first receive terminal 466 can also connect through a capacitor 474 and a resistor 476 to a connection between two of the impedances 464, 466. Similarly, the second receive terminal 468 can connect through a capacitor 478 and a resistor 480 to a connection between two of the impedances 462, 464. The second receive terminal 468 can also connect through a resistor 482 and a capacitor 484 to the second output terminal 460.

The characteristics of the adjustable hybrid 212 can be determined by setting the values of the various components. Table 3 shows exemplary component values for the adjustable hybrid 212 in an ADSL system. Of course, the values are exemplary in nature and other values may also be used.

TABLE 3

| Component | Value |
| --- | --- |
| Resistor 454 | 12.45 ohms |
| Resistor 458 | 12.45 ohms |
| Capacitor 470 | 680 pF |
| Resistor 472 | 732 ohms |
| Capacitor 474 | 680 pF |
| Resistor 476 | 732 ohms |
| Capacitor 478 | 680 pF |
| Resistor 480 | 732 ohms |
| Capacitor 482 | 680 pF |
| Resistor 484 | 732 ohms |

Figure 13:
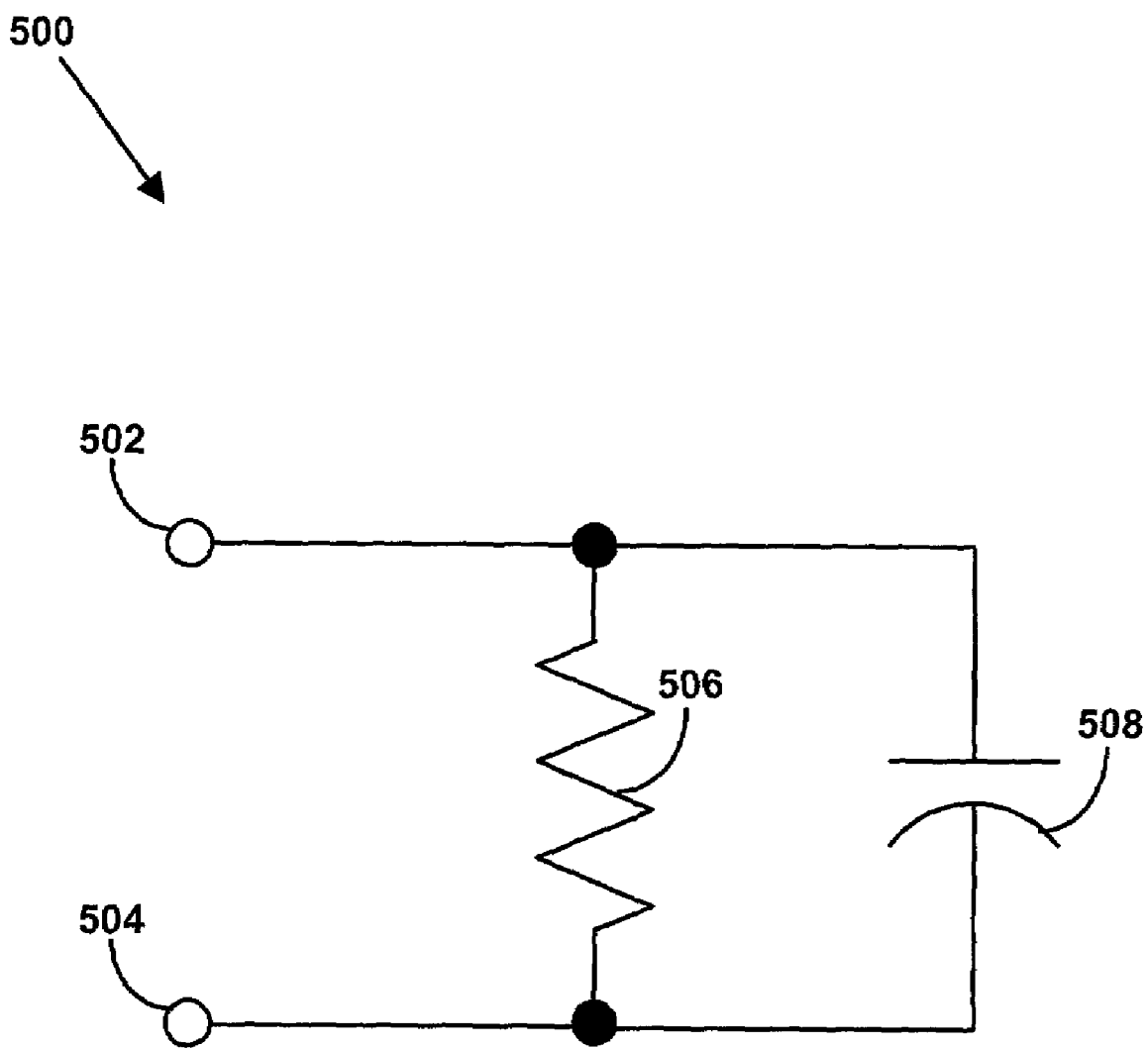
FIG. 13 is an exemplary impedance that may be used in the adjustable hybrid of FIG. 12.

FIG. 13 is an exemplary implementation of an impedance 500 that may be used as impedances Z1 462, 466 in the adjustable hybrid 212. The impedance 500 has two terminals 502, 504. A first terminal 502 connects with a second terminal 504 through a resistor 506 and a capacitor 508 in parallel. The values of the resistor 506 and capacitor 508 can be selected to determine the complex impedance value of the circuit 500. For example, the resistor 506 may be a 169 ohm resistor, and the capacitor 508 may be a 470 pF capacitor. These values, however, may be changed to adjust the overall complex impedance of the circuit 500.

Figure 14:
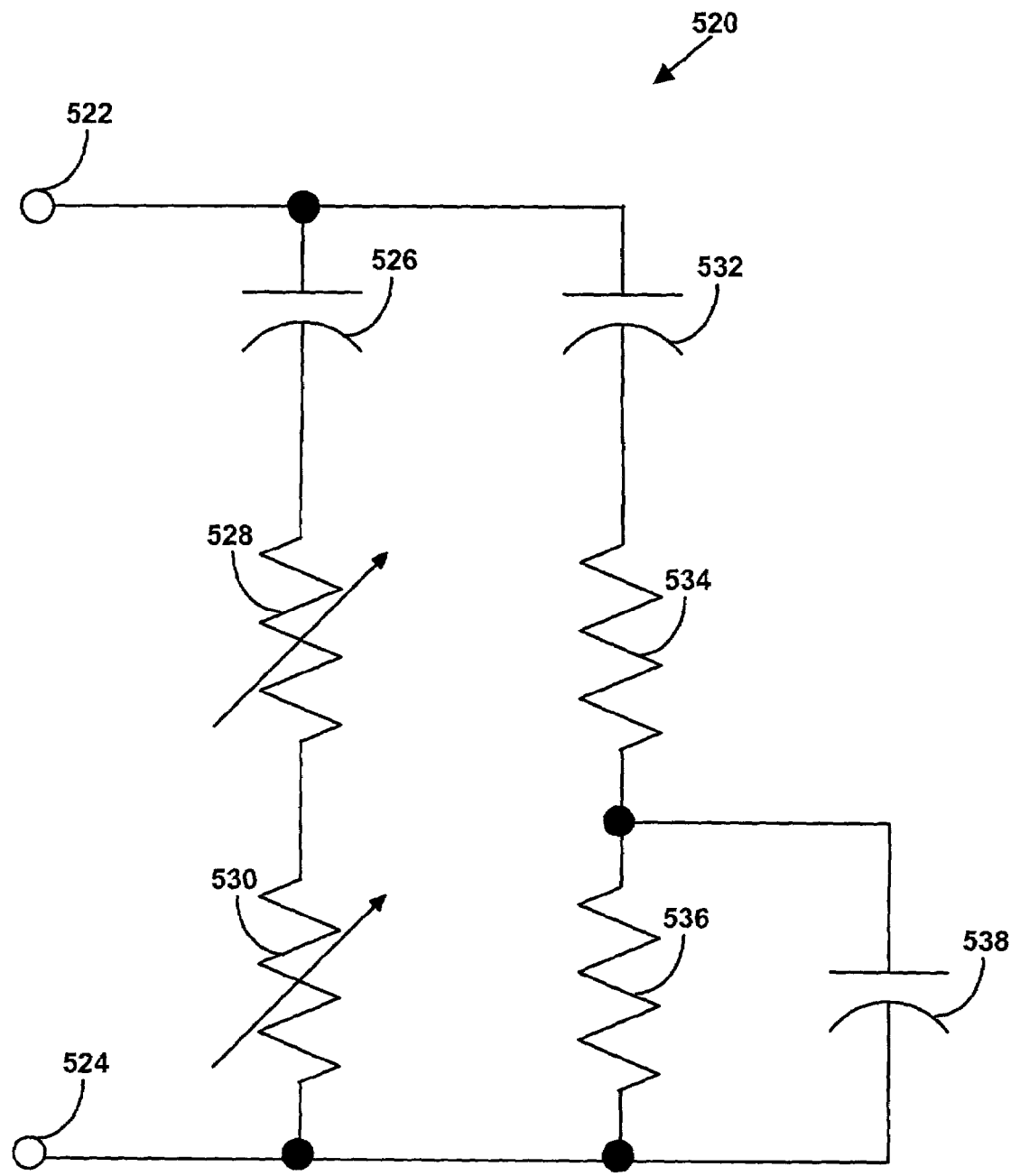
FIG. 14 is an exemplary variable impedance that may be used in the adjustable hybrid of FIG. 12.

FIG. 14 is an exemplary implementation of a variable impedance circuit 520 that may be used as impedance Z2 464 in the adjustable hybrid 212. The variable impedance circuit 520 can have two terminals 522, 524. A first terminal 522 can connect to a second terminal 524 through a capacitor 526 and two variable resistors 528, 530 in series. The first terminal 522 can also connect to the second terminal 524 through a capacitor 532 and two resistors 534, 536 in series. The capacitor 526 and two variable resistors 528, 530 are in parallel with the capacitor 532 and two resistors 534. An additional capacitor 538 connects in parallel with the resistor 536.

Table 4 shows exemplary values for the adjustable impedance circuit 520. These values reflect the adjustable impedance circuit 520 tuned for an ADSL system with no bridge taps. These values are exemplary in nature, and other values may also be used.

TABLE 4

| Component | Value |
| --- | --- |
| Capacitor 526 | 3000 pF |
| Variable Resistor 528 | 580 ohms |
| Variable Resistor 530 | 0 ohms |
| Capacitor 532 | 5600 pF |
| Resistor 534 | 1000 ohms |
| Resistor 536 | 2430 ohms |
| Capacitor 538 | 0.015 uF |

Table 5 shows exemplary values for the adjustable impedance circuit 520 tuned for an XDSL system with bridge taps located directly at the ADSL modem. Of course, these values are exemplary in nature, and other values may also be used.

TABLE 5

| Component | Value |
| --- | --- |
| Capacitor 526 | 3000 pF |
| Variable Resistor 528 | 60 ohms |
| Variable Resistor 530 | 0 ohms |
| Capacitor 532 | 5600 pF |

TABLE 5-continued

| Component | Value |
| --- | --- |
| Resistor 534 | 1000 ohms |
| Resistor 536 | 2430 ohms |
| Capacitor 538 | 0.015 uF |

The variable resistors 528, 530 can be controlled by the DSP 222. The DSP 222 can determine conditions within the XDSL system 520, for example at synchronization with the central office 102. Then, the DSP 222 can adjust one or both of the variable resistors 528, 530 in the adjustable impedance circuit 520 in order to more accurately tune the circuit 520 to match the XDSL system 100 conditions. For example, if Z2/Z1=Zin/12.45,where Zin is the impedance looking from the adjustable hybrid 212 toward the central office 102, then the hybrid 212 may optimally cancel the transmit signal in the receive path.

Other adjustments and variations to the adjustable impedance circuit 520, such as adding additional capacitors, resistors or inductors may be made. These can compensate for other conditions, such as variable bridge tap lengths and locations. Additionally, the DSP 222 may make adjustments to the impedance of this circuit in conjunction with other power spectral density shaping techniques.

Figure 15:
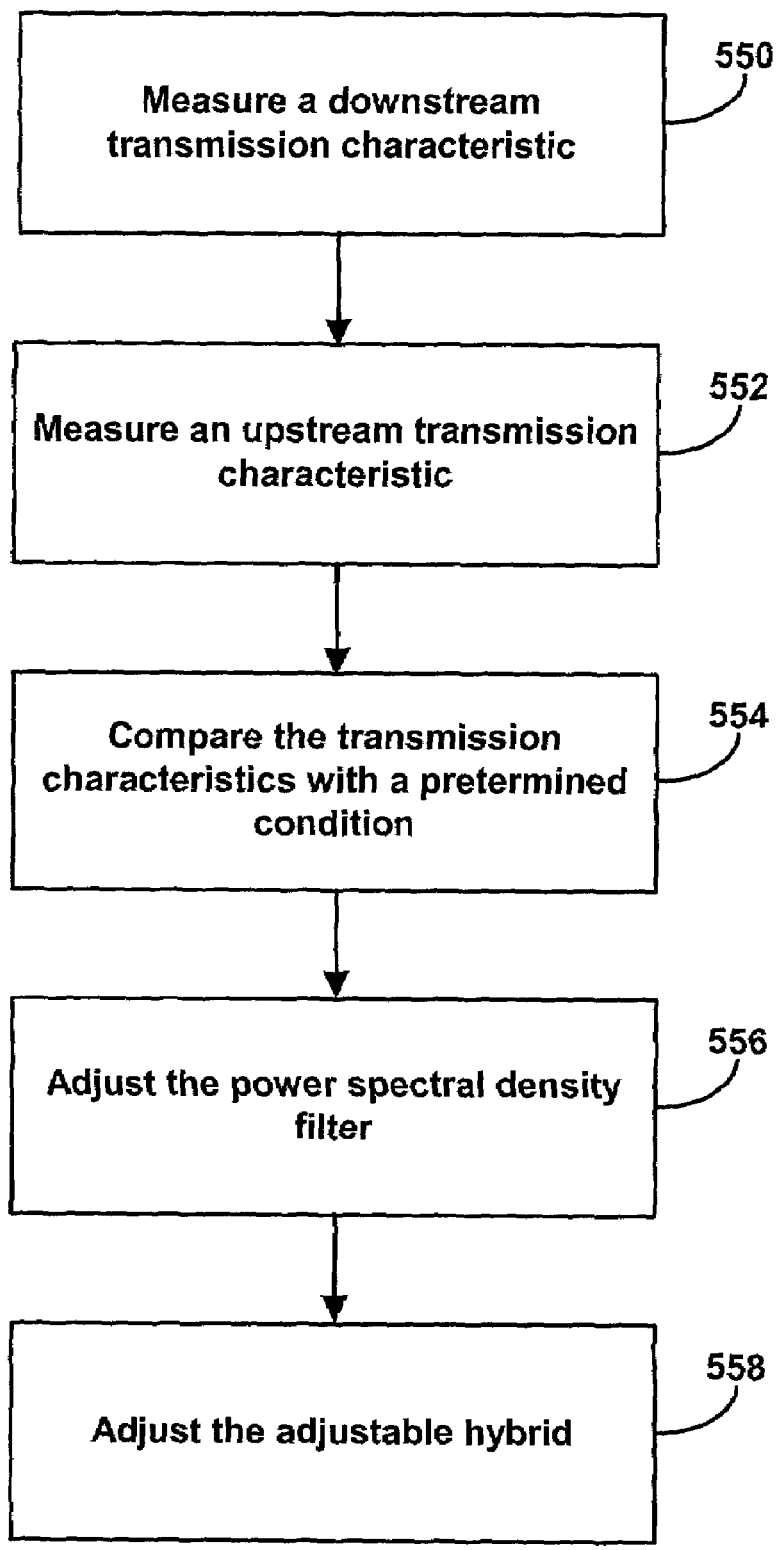
FIG. 15 is a flowchart of an exemplary method for adjusting a power spectral density shaping filter and an adjustable hybrid.

FIG. 15 is a flowchart for an exemplary method of adjusting the power spectral density filter and for adjusting the adjustable hybrid. At Step 550, the XDSL modem measures a downstream transmission characteristic, such as a signal-to-noise margin or a data rate; however, it may also be another characteristic. Then, at Step 552, the XDSL modem measures an upstream transmission characteristic. The upstream transmission characteristics may also be a signal-to-noise margin, a data rate or another characteristic. As previously discussed with respect to FIG. 11, these steps can be performed simultaneously, such as during a synchronization process, or they may be performed in a different order.

At Step 554, the XDSL modem compares the transmission characteristics with a predetermined condition. At Step 556 the XDSL modem adjusts the power spectral density shaping filter. The XDSL modem also adjusts the adjustable hybrid, show at Step 558. While FIG. 15 shows the power spectral density shaping filter and adjustable hybrid changed at different step, they may be adjusted simultaneously or in different orders.

In addition to the various discussed in FIG. 11, the XDSL modem may make other changes to the method of FIG. 15. For example, the XDSL modem may perform signal processing on upstream signals before sending them to the power spectral density shaping filter. This may be done, for example, in the DSP. The signal processing may be done in addition to or in place of adjusting the power spectral density shaping filter. In another embodiment, the XDSL modem may adjust the adjustable hybrid without making changes to the power spectral density shaping filter or without performing additional signal processing in the DSP. In yet another embodiment, the XDSL modem may only measure a downstream transmission characteristic or an upstream transmission characteristic to determine whether to apply power spectral density shaping. These variations are not exhaustive, and many others are also possible.

It should be understood that the programs, processes, methods and apparatus described herein are not related or limited to any particular type of computer or network apparatus (hardware or software), unless indicated otherwise.

Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. An ADSL transceiver comprising:
   an upstream transmission path filter comprising at least one adjustable power spectral density shaping filter for increasing a stopband between an upstream frequency range and a downstream frequency range for ADSL communications over an ADSL transmission line;
   a hybrid circuit communicatively coupled to an output from the upstream transmission path filter, wherein the hybrid circuit connects to the ADSL transmission line; and
   a processor communicatively coupled to the upstream transmission path, wherein the processor selectively adjusts the power spectral density shaping filter based on at least one condition causing an impedance mismatch between the hybrid circuit and the ADSL transmission line.

2. The ADSL transceiver of claim 1, wherein the at least one adjustable power spectral density shaping filter includes an operational amplifier.

3. The ADSL transceiver of claim 1, wherein the at least one adjustable power spectral density shaping filter includes a bandpass filter having a passband.

4. The ADSL transceiver of claim 3, wherein the at least one adjustable power spectral density shaping filter includes an analog switch for selectively engaging power spectral density shaping within the passband.

5. The ADSL transceiver of claim 3, wherein the at least one adjustable power spectral density shaping filter includes a relay for selectively engaging power spectral density shaping within the passband.

6. The ADSL transceiver of claim 3, wherein the passband is in the range of about 30 KHz to about 138 KHz.

7. The ADSL transceiver of claim 1, wherein the at least one adjustable power spectral density shaping filter includes two adjustable power spectral density shaping filters.

8. The ADSL transceiver of claim 7, wherein the two adjustable power spectral density shaping filters are in a differential pair configuration.

9. The ADSL transceiver of claim 3, wherein the at least one adjustable power spectral density shaping filter includes a variable resistor controllable by the processor, and wherein the variable resistor controls power spectral density shaping within the passband.

10. The ADSL transceiver of claim 1, further comprising:
    a digital-to-analog converter, wherein the digital-to-analog converter receives a digital output from the processor, and wherein the digital-to-analog converter provides an analog input to the upstream transmission path filter.

11. The ADSL transceiver of claim 1, wherein the hybrid circuit further comprises a plurality of selectable impedance circuits, and wherein each of the plurality of selectable impedance circuits is selectively coupled with the ADSL transmission line and the output of the upstream transmission path filter.

12. The ADSL transceiver of claim 1, wherein the at least one adjustable power spectral density shaping filter is on a printed circuit board.

13. The ADSL transceiver of claim 1, wherein the processor measures transmission characteristics on the ADSL transmission line to determine the impedance mismatch between the hybrid circuit and the ADSL transmission line.

14. The ADSL transceiver of claim 1, wherein the processor measures a reflection of upstream signals into the downstream frequency range to determine the impedance mismatch between the hybrid circuit and the ADSL transmission line.

* * * * *